(12) United States Patent
Shimomura

(10) Patent No.: US 9,001,256 B2
(45) Date of Patent: Apr. 7, 2015

(54) ZOOM LENS AND IMAGE PICKUP APPARATUS INCLUDING THE SAME

(71) Applicant: Canon Kabushiki Kaisha, Tokyo (JP)

(72) Inventor: Kazuya Shimomura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 59 days.

(21) Appl. No.: 13/966,405

(22) Filed: Aug. 14, 2013

(65) Prior Publication Data

US 2014/0049681 A1 Feb. 20, 2014

(30) Foreign Application Priority Data

Aug. 17, 2012 (JP) ................... 2012-180895

(51) Int. Cl.
| | |
|---|---|
| *H04N 5/225* | (2006.01) |
| *G02B 13/16* | (2006.01) |
| *G02B 15/14* | (2006.01) |
| *G02B 15/17* | (2006.01) |

(52) U.S. Cl.
CPC ............... *G02B 15/14* (2013.01); *G02B 15/17* (2013.01)

(58) Field of Classification Search
USPC ............... 348/335, 340, 345, 348, 350, 352; 359/677, 683, 689
See application file for complete search history.

(56) References Cited

U.S. PATENT DOCUMENTS

| 5,808,809 | A | 9/1998 | Yahagi |
| 8,023,196 | B2 * | 9/2011 | Lin ............................. 359/650 |

FOREIGN PATENT DOCUMENTS

| JP | 07151966 A | 6/1995 |
| JP | 09-258102 A | 10/1997 |
| JP | 09258102 A | 10/1997 |

OTHER PUBLICATIONS

Extended European Search Report for corresponding EP 13004035.5, mail date Apr. 10, 2014.

* cited by examiner

*Primary Examiner* — Yogesh Aggarwal
(74) *Attorney, Agent, or Firm* — Rossi, Kimms & McDowell LLP

(57) ABSTRACT

A zoom lens in which aberration variations at telephoto end during focusing are suppressed while suppressing breathing at wide angle end, which includes, from object side: a positive first unit which does not move for zooming; a negative second unit which moves during zooming; at least one zooming unit which moves during zooming; a stop; and an imaging unit which does not move for zooming. The first unit includes: a negative first sub unit which does not move for focusing; a positive second sub unit which moves to image side during focusing from infinity to proximity; and a positive third sub unit which moves to object side during focusing from infinity to proximity. Focal lengths of the first, second, first sub, and second sub units, and amounts of movement of the second and third sub units during the focusing from infinity proximity are appropriately set.

6 Claims, 18 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens which is suitable for use in a broadcasting television camera, a cinema camera, a video camera, a digital still camera, and a silver-halide film camera, for example.

2. Description of the Related Art

In recent years, a zoom lens having a large aperture ratio, a high zoom ratio, and high optical performance is required for an image pickup apparatus such as a television camera, a cinema camera, a film camera, or a video camera. In particular, in the television/cinema camera as a professional video photography system, image pickup devices having image sizes of a wide range from ½ inch (diagonal length: 8 mm) and ⅔ inches (diagonal length: 11 mm) to 35 mm (diagonal length: about 28 to 43.3 mm) have been introduced in the market. Mainstream image pickup devices such as a charge coupled device (CCD) and a complementary metal-oxide semiconductor (CMOS) have a substantially even resolution over the entire image pickup range, and hence a zoom lens for use with such image pickup device is required to have a substantially even resolution from a center to a periphery of the screen.

Moreover, further increases in number of pixels for the image pickup devices have been advancing, such as 1,920×1,080 pixels (1080i) for HDTV and 4,096×2,160 pixels for 4K, and the demands for increased performance of the zoom lens have become ever stronger with the increases in resolution. For example, a CCD compatible with ⅔-inch HDTV has an image size of 9.6 mm×5.4 mm and a pixel size of 5 μm×5 μm.

Meanwhile, in professional video photography, it is desired to strictly set a photography range (angle of field), in particular. On the other hand, a lens generally has a problem in that the angle of field changes accompanying focus adjustment (hereinafter referred to as breathing). On a telephoto side, a depth of field is shallow and hence the remaining change in angle of field, if any, accompanying the focus adjustment is not conspicuous, but on a wide angle side, the depth of field is deep and hence it appears as if zooming is performed.

As zoom lenses having a large aperture ratio and a high zoom ratio, there have conventionally been proposed a wide variety of zoom lenses of a so-called floating focus type in which a lens unit located on an object side of a zoom lens unit performs the focus adjustment and a plurality of lens units move accompanying the focus adjustment.

For example, Japanese Patent Application Laid-Open No. H07-151966 discloses a zoom lens having an F-number at a wide angle end of about 1.7 to 1.9, an angle of field at the wide angle end of about 57 degrees to 63 degrees, an angle of field at a telephoto end of about 1.5 to 5 degrees, and a zoom ratio of about 13 to 44. A first lens unit includes a first sub lens unit having a negative refractive power, a second sub lens unit having a positive refractive power, and a third sub lens unit having the positive refractive power, and is configured so that, during focus adjustment from an object at infinity to an object at a short distance, both the second sub lens unit and the third sub lens unit move to the object side.

Moreover, Japanese Patent Application Laid-Open No. H09-258102 discloses a zoom lens having an F-number at the wide angle end of about 1.8, an angle of field at the wide angle end of about 90 to 102 degrees, an angle of field at the telephoto end of about 13 degrees, and a zoom ratio of about 8 to 10. The first lens unit includes a first sub lens unit having the negative refractive power, a second sub lens unit having the positive refractive power, and a third sub lens unit having the positive refractive power, and is configured so that, during focus adjustment from the object at infinity to the object at the short distance, the second sub lens unit moves to an image side and the third sub lens unit moves to the object side.

In general, in order to attain a zoom lens having a large aperture ratio and a high zoom ratio in which aberration variations are small and optical performance is high over an entire zoom range and an entire focus range, and in which the breathing is little at the wide angle end, there occurs a problem in that the number of lenses is increased, which leads to an increase in size of the entire lens system. Further, in order to attain a zoom lens having high optical performance in which the aberration variations are small over the entire focus range at the telephoto end, there occurs a problem in that the number of lenses of the first lens unit is further increased, which leads to an increase in size of the entire lens system. This tendency becomes more conspicuous as a focal length at the telephoto end becomes longer.

In order for the zoom lens to have a large aperture ratio (F-number of about 1.8 to 2.7), a wide angle of field, and a high zoom ratio (zoom ratio of 7 to 70) and to reduce the breathing at the wide angle end (to 4% or lower), the refractive powers, lens configurations, aberration contributions, and the like of the lens units need to be set appropriately. In particular, in order to suppress the breathing at the wide angle end and the aberration variations during focusing at the telephoto end at the same time while attaining reductions in size and weight of the entire zoom lens, settings and refractive power arrangements of the sub lens units which move for focusing of the first lens unit, configurations of sub systems, and the like need to be set appropriately.

When the focus type disclosed in Japanese Patent Application Laid-Open No. H07-151966 is used, it is difficult to suppress the breathing at the wide angle end. Further, with the refractive power arrangement and the lens configurations of Japanese Patent Application Laid-Open No. H09-258102, it is difficult to attain both the high optical performance and the suppression of the breathing at the wide angle end in the zoom lens having an angle of field at the telephoto end of less than 10 degrees.

SUMMARY OF THE INVENTION

In view of the above, the present invention provides a zoom lens in which, by appropriately setting configurations, refractive powers, and the like of a first lens unit and sub lens units which move for focusing as sub systems thereof, aberration variations during focusing, which are conspicuous at a telephoto end, are suppressed while suppressing breathing, which is conspicuous especially at a wide angle end. Further, the present invention provides a zoom lens having a large aperture ratio, a high zoom ratio, a small size, and high performance, with an F-number at the wide angle end of about 1.8 to 2.7, an angle of field at the wide angle end of about 50 to 70 degrees, an angle of field at the telephoto end of about 1 to 8 degrees, and a zoom ratio of about 7 to 70.

According to one embodiment of the present invention, there is provided a zoom lens, including, in order from an object side: a first lens unit having a positive refractive power which does not move for zooming; a second lens unit having a negative refractive power which moves during zooming; at least one zoom lens unit which moves during zooming; a stop;

and an imaging lens unit which does not move for zooming, in which the first lens unit includes: a first sub lens unit having the negative refractive power which does not move for focus adjustment; a second sub lens unit having the positive refractive power which moves to an image side during the focus adjustment from an object at infinity to an object at a short distance; and a third sub lens unit having the positive refractive power which moves to the object side during the focus adjustment from the object at infinity to the object at the short distance, and in which the following conditional expressions are satisfied:

$-15.0 < f1/f2 < -2.0;$ $-1.50 < f11/f12 < -0.35;$ and $2.5 \leq |\delta 12/\delta 13| < 15.0,$ where f1 is a focal length of the first lens unit, f2 is a focal length of the second lens unit, f11 is a focal length of the first sub lens unit, f12 is a focal length of the second sub lens unit, δ12 is an amount of movement of the second sub lens unit during the focus adjustment from the object at infinity to an object at a minimum distance, and δ13 is an amount of movement of the third sub lens unit during the focus adjustment from the object at infinity to the object at the minimum distance.

It is possible to attain the zoom lens in which, by appropriately setting the configurations, the refractive powers, and the like of the first lens unit and the sub lens units which move for focusing as sub systems thereof, the aberration variations during focusing, which are conspicuous at the telephoto end, are suppressed while suppressing the breathing, which is conspicuous especially at the wide angle end.

Further features of the present invention will become apparent from the following description of exemplary embodiments with reference to the attached drawings.

DESCRIPTION OF THE EMBODIMENTS

Figure 1A:
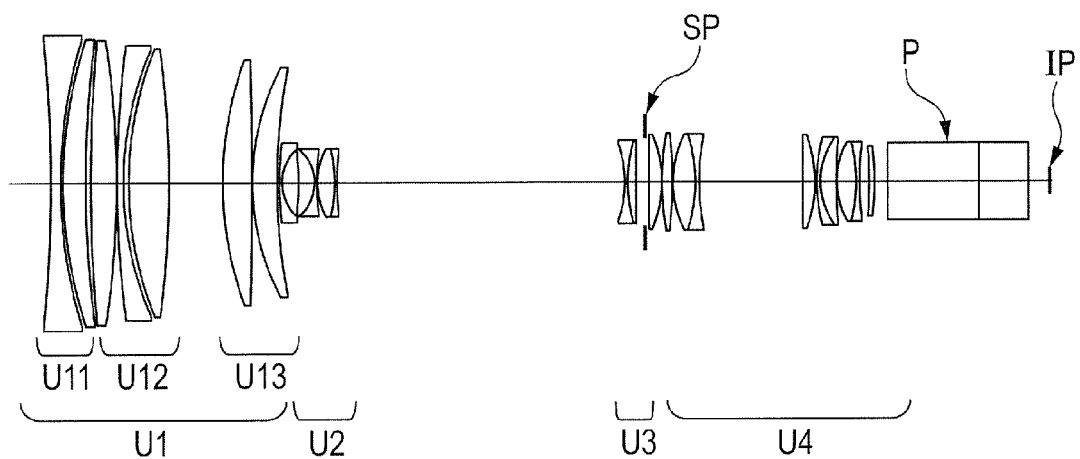
FIG. 1A is a lens cross-sectional view when focused on an object at infinity at a wide angle end according to Embodiment 1 of the present invention.

Now, exemplary embodiments of the present invention are described in detail based on the accompanying drawings.

First, features of a zoom lens according to the present invention are described by means of conditional expressions. In the zoom lens of the present invention, in order to attain high optical performance over an entire focus range and to suppress breathing, a configuration of a first lens unit, a ratio of focal lengths of the first lens unit and a second lens unit, a ratio of focal lengths of a first sub lens unit and a second sub lens unit, and a relationship of amounts of movement of the second sub lens unit and a third sub lens unit during focus adjustment are defined.

The zoom lens according to the present invention includes, in order from an object side, the first lens unit having a positive refractive power which does not move for zooming, the second lens unit having a negative refractive power which moves during zooming, at least one zoom lens unit which moves during zooming, a stop, and a fixed lens unit (imaging lens unit) which does not move for zooming. The first lens unit includes the first sub lens unit having the negative refractive power which does not move for focusing, the second sub lens unit having the positive refractive power which moves to an image side during the focus adjustment from an object at infinity to an object at a short distance, and the third sub lens unit having the positive refractive power which moves to the object side during the focus adjustment from the object at infinity to the object at the short distance.

Note that, the phrase "a lens unit does not move for zooming" as used herein means that the lens unit does not move for the purpose of zooming during the zooming but may move for another purpose such as the focus adjustment during the zooming. Similarly, the phrase "a lens unit does not move for focusing" means that the lens unit does not move for the purpose of focus adjustment during the focus adjustment, but may move for another purpose such as zooming during the focus adjustment.

Further, the following conditional expressions are satisfied:

$$-15.0 < f1/f2 < -2.0 \quad (1);$$

$$-1.50 < f11/f12 < -0.35 \quad (2); \text{ and}$$

$$2.5 \le |\delta12/\delta13| < 15.0 \quad (3),$$

where f1 is the focal length of the first lens unit, f2 is the focal length of the second lens unit, f11 is the focal length of the first sub lens unit, f12 is the focal length of the second sub lens unit, and δ12 and δ13 are the amounts of movement of the second sub lens unit and the third sub lens unit during the focus adjustment from the object at infinity to an object at a minimum distance (interval between a position when focused on the object at infinity and a position when focused on the object at the minimum distance), respectively.

Optical actions obtained when the above-mentioned focus type is employed in the present invention are described.

In general, a telephoto zoom lens having a long focal length at a telephoto end employs an inner-focus type in which the first lens unit includes a first sub lens unit which does not move for the focus adjustment, and a second sub lens unit which moves to the object side during the focus adjustment from the object at infinity to the object at the short distance.

Figure 22A:
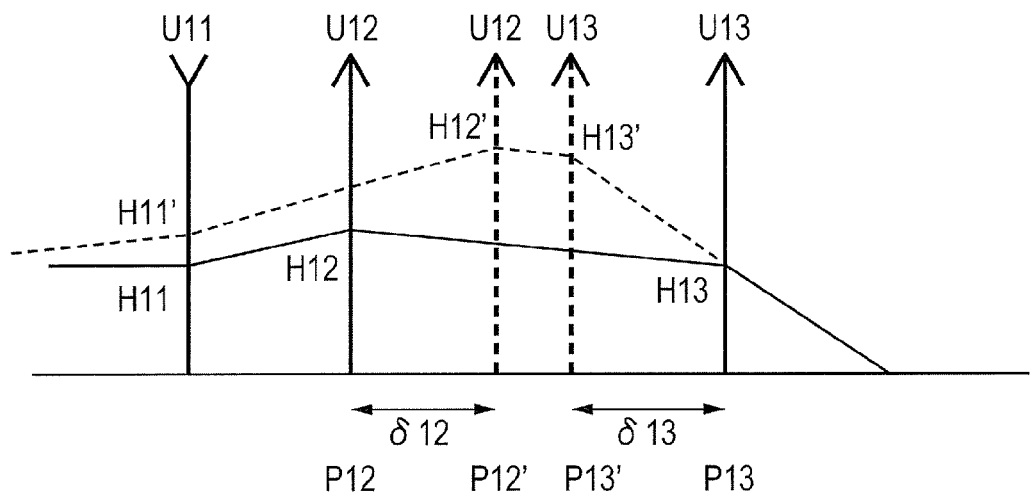
FIG. 22A is a conceptual diagram illustrating an arrangement of lens sub units in a first lens unit (in a case where focus adjustment is performed by moving a second sub lens unit to an image side and moving a third sub lens unit to an object side).
Figure 22B:
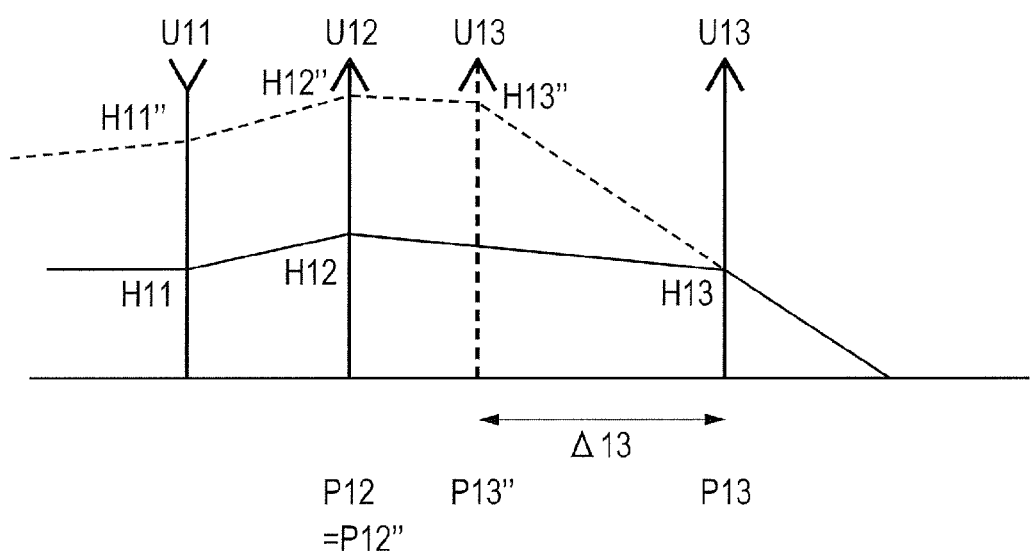
FIG. 22B is a conceptual diagram illustrating an arrangement of the lens sub units in the first lens unit (in a case where the focus adjustment is performed by moving only the third sub lens unit to the object side).

Next, consideration is given of a case where, as in the present invention, a first lens unit U1 includes a first sub lens unit U11 having the negative refractive power, a second sub lens unit U12 having the positive refractive power, and a third sub lens unit U13 having the positive refractive power. An axial paraxial ray when the object is at infinity is represented by the solid line, positions of the second sub lens unit and the third sub lens unit on an optical axis at the time are represented by P12 and P13, and incident heights of the axial paraxial ray on the first sub lens unit, the second sub lens unit, and the third sub lens unit are represented by H11, H12, and H13. A comparison is made here of a case where, as in FIG. 22A, the second sub lens unit is moved to the image side and the third sub lens unit is moved to the object side to perform the focus adjustment (Type A), and the case of the above-mentioned inner-focus type in which, as in FIG. 22B, only the third sub lens unit is moved to the object side to perform the focus adjustment (Type B). In FIG. 22A, the axial paraxial ray when the object is at a predetermined finite distance is represented by the broken line, positions of the second sub lens unit and the third sub lens unit on the optical axis at the time are represented by P12' and P13', and incident heights of the axial paraxial ray on the first sub lens unit, the second sub lens unit, and the third sub lens unit are represented by H11', H12', and H13'. On the other hand, in FIG. 22B, the axial paraxial ray when the object is at the predetermined finite distance is represented by the broken line, positions of the second sub lens unit and the third sub lens unit on the optical axis at the time are represented by P12" and P13", and incident heights of the axial paraxial ray on the first sub lens unit, the second sub lens unit, and the third sub lens unit are represented by H11", H12", and H13".

When it is defined that δ12=P12'-P12, δ13=P13-P13', and Δ13=P13-P13", the following relationships are established:

$$\Delta13 > \delta13 \quad (9); \text{ and}$$

$$\Delta13 < \delta12 + \delta13 \quad (10).$$

In other words, when Type A is employed, a sum of the amounts of movement of the second sub lens unit and the third sub lens unit during the focus adjustment becomes large as compared to Type B, but the amount of movement of the third sub lens unit may be reduced. As a result, when the object is at the predetermined finite distance, comparing Type A and Type B, the second sub lens unit and the third sub lens unit are located closer to the image side in Type A. As a result, the relationships of the incident heights of the axial paraxial ray described above can be written as follows:

$$H11 < H11' < H11'' \quad (11);$$

$$H12 < H12' < H12'' \quad (12); \text{ and}$$

$$H13 < H13' < H13'' \quad (13).$$

In other words, as compared to Type B, Type A has a smaller change in incident heights of the paraxial ray on the first sub lens unit, the second sub lens unit, and the third sub lens unit accompanying the focus adjustment. In the third-order aberration theory, for example, a first-order aberration coefficient L of an axial chromatic aberration is proportional to the square of a paraxial ray height H, and a third-order aberration coefficient I of a spherical aberration is proportional to the fourth power of the paraxial ray height H. Therefore, as compared to Type B, Type A has smaller aberration variations of the first sub lens unit, the second sub lens unit, and the third sub lens unit from when the object is at infinity to when the object is at the minimum distance, and may suppress the aberration variations accompanying the focus adjustment as the first lens unit. Further, by appropriately setting configurations and the amounts of movement of the sub lens units, the aberration variations caused by the first sub lens unit, the second sub lens unit, and the third sub lens unit during the focus adjustment may be cancelled by each other, and aberration variations when the object is at the minimum distance may be corrected satisfactorily.

The changes of the axial ray caused by the focus adjustment have been described above, but similar relationships as those described above are also established for changes of an off-axial ray caused by the focus adjustment, and Type A has smaller changes of the off-axial ray on the first sub lens unit, the second sub lens unit, and the third sub lens unit caused by the focus adjustment. In the present invention, the changes in aberrations caused by the movements of the second sub lens unit and the third sub lens unit are used to satisfactorily correct the spherical aberration, a coma, and chromatic aberrations especially near the minimum distance on a telephoto end side.

Next, a description is given of suppression of the breathing by a so-called floating focus type in which the two sub lens units including the second sub lens unit and the third sub lens unit move. When the second sub lens unit moves to the image side during the focus adjustment from the object at infinity to the object at the short distance, a focal length of the entire system is shifted to a wide angle side. Meanwhile, when the third sub lens unit moves to the object side during the focus adjustment from the object at infinity to the object at the short distance, the focal length of the entire system is shifted to a telephoto side. Therefore, the breathing may be cancelled by appropriately setting the amounts of movement of the second sub lens unit and the third sub lens unit during the focus adjustment.

Next, a description is given of Conditional Expressions (1) to (3) described above.

Expression (1) defines the ratio of the focal length of the first lens unit and the focal length of the second lens unit. Expression (1) is satisfied to attain both a reduction in size of the zoom lens and correction of the aberration variations. When the upper limit condition of Expression (1) is not satisfied, a power of the first lens unit is increased, which makes it difficult to correct variations in aberrations accompanying the focusing (hereinafter referred to as focusing variations). To the contrary, when the lower limit condition of Expression (1) is not satisfied, the power of the first lens unit is reduced, which makes it difficult to reduce the size of the zoom lens. It is further preferred to set Conditional Expression (1) as follows:

$$-9.0 < f1/f2 < -2.2 \quad (1a).$$

Further, Expression (2) defines the ratio of the focal length of the first sub lens unit and the focal length of the second sub lens unit. Expression (2) is satisfied so that an image side principal point of the first lens unit may be set to an appropriate position, to thereby attain the reduction in amount of movement of the zoom lens unit during the zooming and the reduction in size of the first lens unit. When the upper limit condition of Expression (2) is not satisfied, the position of the image side principal point of the first lens unit is on the image side, which moves an object point of the second lens unit (image point of the first lens unit) away from the second lens unit. Therefore, the amount of movement of the second lens unit during the zooming is increased, which makes it difficult to reduce the size of the zoom lens. To the contrary, when the lower limit condition of Expression (2) is not satisfied, the position of the image side principal point of the first lens unit is on the object side, which increases the size of the first lens unit, especially of the first sub lens unit. It is further preferred to set Conditional Expression (2) as follows:

$$-1.2 < f11/f12 < -0.5 \quad (2a).$$

Further, Expression (3) defines the amounts of movement of the second sub lens unit and the third sub lens unit during the focus adjustment. Expression (3) is satisfied to attain both the reduction in size of the zoom lens and the suppression of the breathing. When the upper limit condition of Expression (3) is not satisfied, the amount of movement of the second sub lens unit during the focus adjustment is increased, which makes it difficult to reduce the size of the zoom lens. To the contrary, when the lower limit condition of Expression (3) is not satisfied, the amount of movement of the second sub lens unit during the focus adjustment is reduced, which increases a focal length near the minimum distance and makes it difficult to suppress the breathing. It is further preferred to set Conditional Expression (3) as follows:

$$2.7 < |\delta12/\delta13| < 11.0 \quad (3a).$$

Moreover, the zoom lens according to the present invention defines a ratio of focal lengths of the second sub lens unit and the third sub lens unit to the focal length of the first lens unit while correcting the focusing variations. The following conditional expressions are satisfied:

$$1.0 < f12/f1 < 4.0 \quad (4); \text{ and}$$

$$0.8 < f13/f1 < 1.3 \quad (5),$$

where f13 is the focal length of the third sub lens unit. When the upper limit condition of Expression (4) is not satisfied, a power of the second sub lens unit is reduced, which increases the amount of movement of the second sub lens unit during the focus adjustment. To the contrary, when the lower limit condition of Expression (4) is not satisfied, the power of the second sub lens unit is increased, which causes higher-order aberrations accompanying focusing and makes it difficult to correct the aberrations. Further, when the number of lenses of the second sub lens unit is increased to correct the focusing variations, a mass of the second sub lens unit is increased, which leads to a reduction in tracking performance of the focusing and an increase in size of a driving mechanism.

Further, when the upper limit condition of Expression (5) is not satisfied, a power of the third sub lens unit is reduced, which increases the amount of movement of the third sub lens unit during the focus adjustment and makes it difficult to reduce the size of the first lens unit. To the contrary, when the lower limit condition of Expression (5) is not satisfied, the power of the third sub lens unit is increased, which causes the higher-order aberrations and makes it difficult to correct remaining aberrations thereof.

It is further preferred to set Conditional Expressions (4) and (5) as follows:

$$1.2<f12/f1<3.5 \quad (4a); \text{ and}$$

$$0.90<f13/f1<1.15 \quad (5a).$$

Moreover, the zoom lens according to the present invention defines a lens configuration of the first sub lens unit in order to set the image side principal point of the first lens unit to the appropriate position. The first sub lens unit includes one or more concave lenses and one convex lens, and includes, in order from the object side, a concave lens 11n and a convex lens 11p, which are arranged in the stated order.

Further, the zoom lens according to the present invention defines a lens configuration and glass materials of the second sub lens unit in order to correct the focusing variations. The second sub lens unit includes at least two convex lenses and at least one concave lens, and satisfies the following conditional expressions:

$$0.15<N12n-N12p<0.60 \quad (6); \text{ and}$$

$$30<v12p-v12n<70 \quad (7),$$

where N12p and v12p are an average refractive index and an average Abbe number of the convex lenses constituting the second sub lens unit, and N12n and v12p are an average refractive index and an average Abbe number of the concave lens constituting the second sub lens unit. When the upper limit condition of Expression (6) is not satisfied, a glass material having a high extraordinary dispersion is used for the concave lens constituting the second sub lens unit, which makes it difficult to correct a second-order spectrum of the chromatic aberrations. To the contrary, when the lower limit condition of Expression (6) is not satisfied, a difference in refractive index of the convex lenses and the concave lens for correcting the aberration variations is reduced, which makes it difficult to correct the focusing variations. Similarly, when the upper limit condition of Expression (7) is not satisfied, the glass material having the high extraordinary dispersion is used for the concave lens constituting the second sub lens unit, which makes it difficult to correct the second-order spectrum of the chromatic aberrations. To the contrary, when the lower limit condition of Expression (7) is not satisfied, refractive powers of the convex lenses and the concave lens constituting the second sub lens unit are increased, which causes the higher-order aberrations and makes it difficult to correct the remaining aberrations thereof. It is further preferred to set Conditional Expressions (6) and (7) as follows:

$$0.23<N12n-N12p<0.50 \quad (6a); \text{ and}$$

$$43<v12p-v12n<58 \quad (7a).$$

It is defined that an image pickup apparatus according to the present invention includes the zoom lens according to each of the embodiments, and a solid-state image pickup element having a predetermined effective image pickup area for receiving an image formed by the zoom lens. In order to reduce a size of the image pickup apparatus according to the present invention and correct the focusing variations, the relationship of the focal length of the third sub lens unit and the amount of movement of the third sub lens unit during the focus adjustment from the object at infinity to the object at the minimum distance is defined. The following conditional expression is satisfied:

$$0.02<|\delta13 \times f1/f13/IS|<1.5 \quad (8),$$

where IS is an image size of the image pickup apparatus (diagonal length of an effective photography area of the solid-state image pickup element). When the upper limit condition of Expression (8) is not satisfied, the amount of movement of the third sub lens unit during the focus adjustment is increased, which increases the focal length near the minimum distance and makes it difficult to suppress the breathing. To the contrary, when the lower limit condition of Expression (8) is not satisfied, the amount of movement of the third sub lens unit having a high contribution in the focusing is reduced, which increases the amount of movement of the second sub lens unit and makes it difficult to reduce the size of the first lens unit. It is further preferred to set Conditional Expression (8) as follows:

$$0.04<|\delta13 \times f1/f13/IS|<1.10 \quad (8a).$$

Now, a description is given of a specific configuration of the zoom lens according to the present invention by means of features of the lens configurations according to Numerical Embodiments 1 to 4 corresponding to Embodiments 1 to 4.

[Embodiment 1]

Figure 1B:
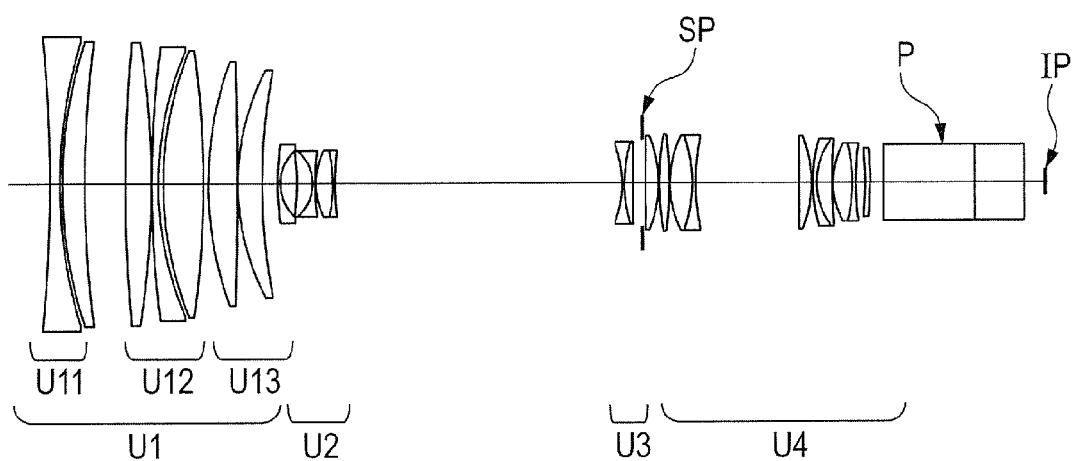
FIG. 1B is a lens cross-sectional view when focused on an object at a minimum distance (2.5 m) at the wide angle end according to Embodiment 1.
Figure 2:
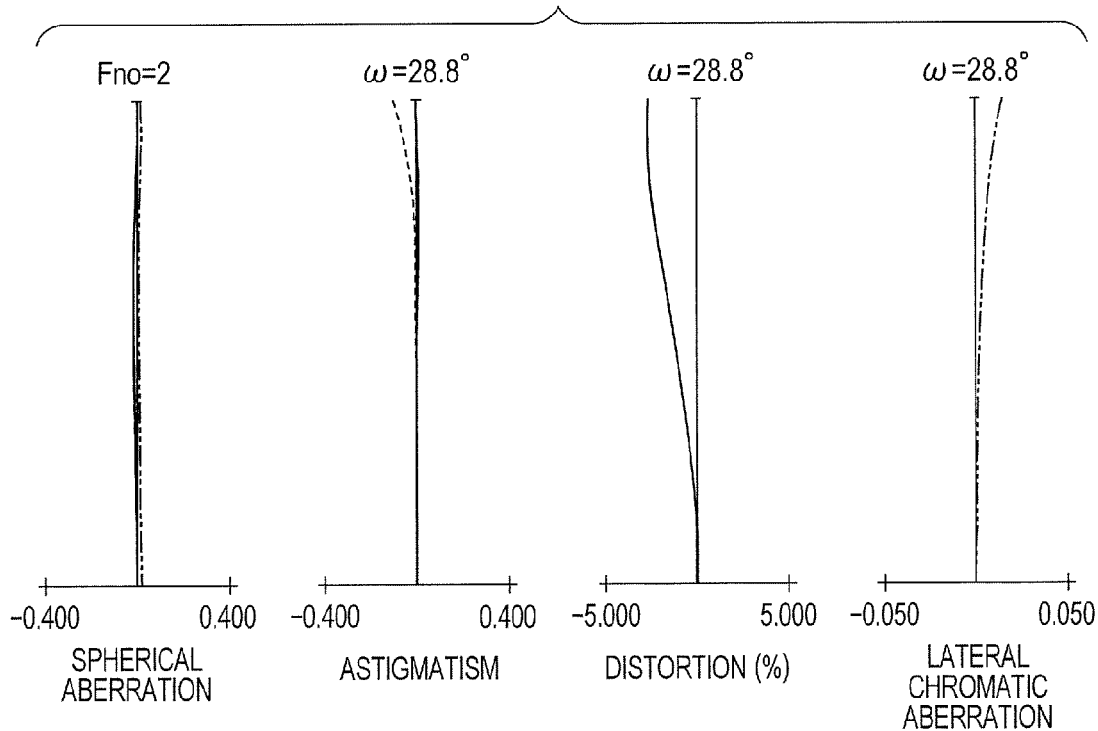
FIG. 2 is a longitudinal aberration diagram at the wide angle end according to Embodiment 1.
Figure 3:
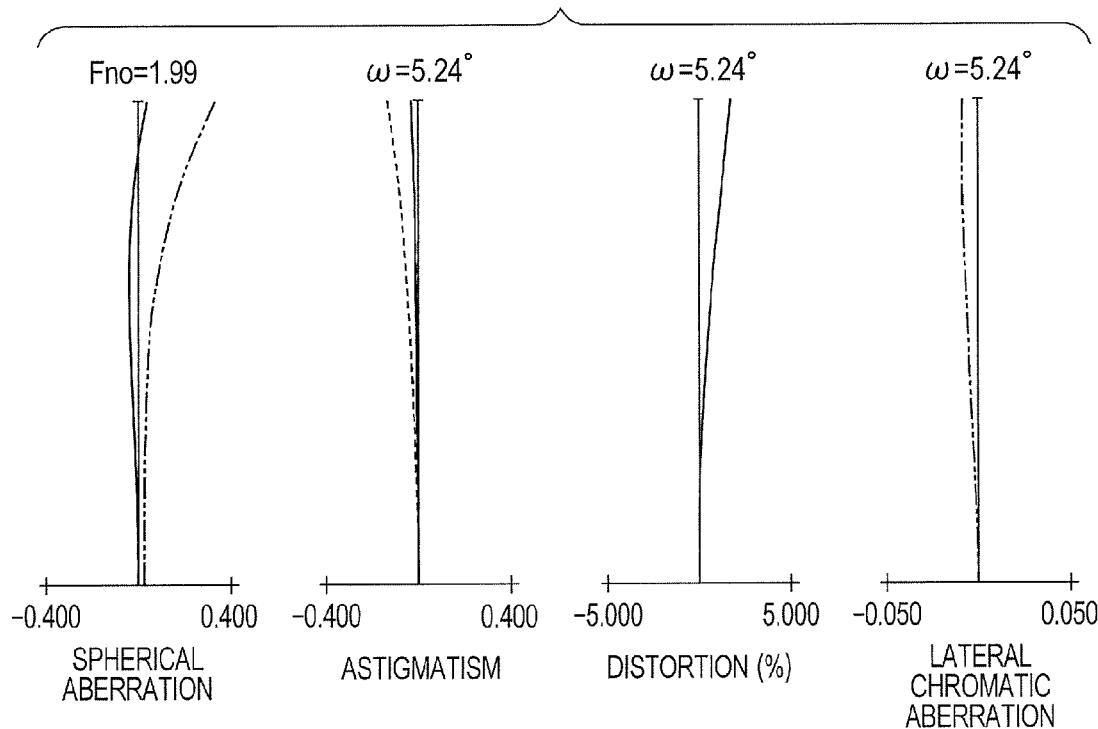
FIG. 3 is a longitudinal aberration diagram at a focal length of 60 mm according to Embodiment 1.
Figure 4A:
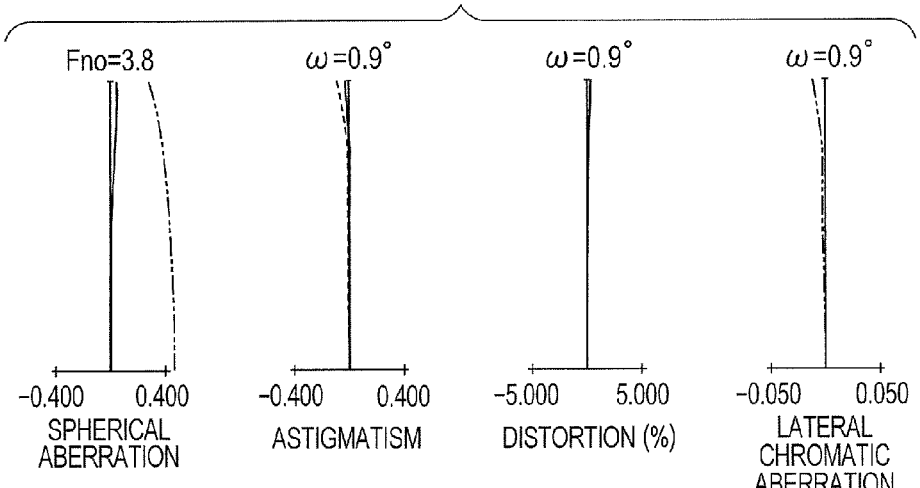
FIG. 4A is a longitudinal aberration diagram when focused on the object at infinity at a telephoto end according to Embodiment 1.
Figure 4B:
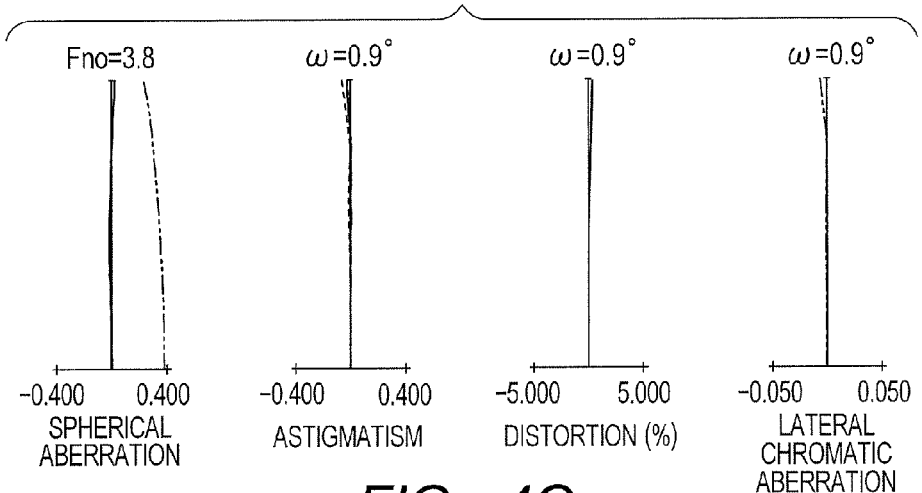
FIG. 4B is a longitudinal aberration diagram when focused on an object distance of 7 m at the telephoto end according to Embodiment 1.
Figure 4C:
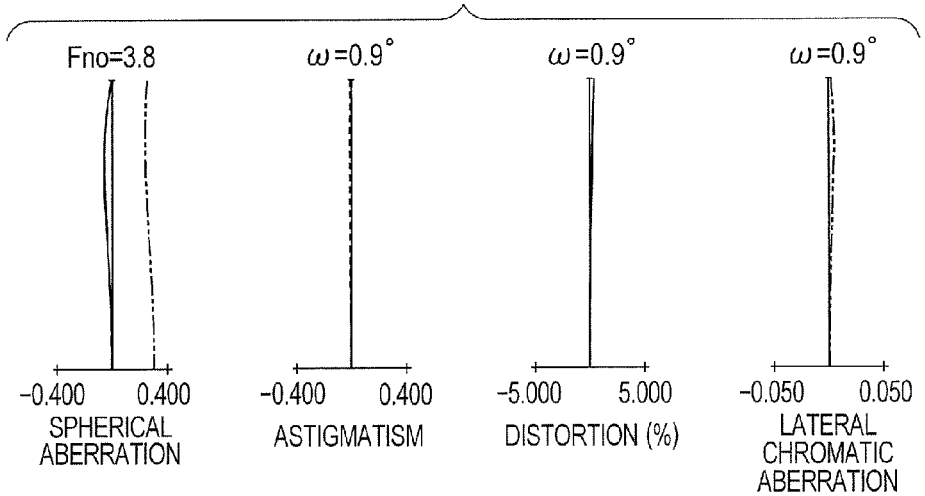
FIG. 4C is a longitudinal aberration diagram when focused on the object at the minimum distance at the telephoto end according to Embodiment 1.
Figure 5A:
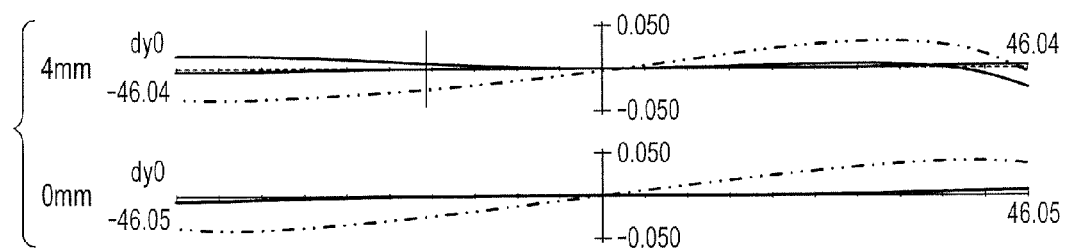
FIG. 5A is a lateral aberration diagram when focused on the object at infinity at the telephoto end according to Embodiment 1.
Figure 5B:
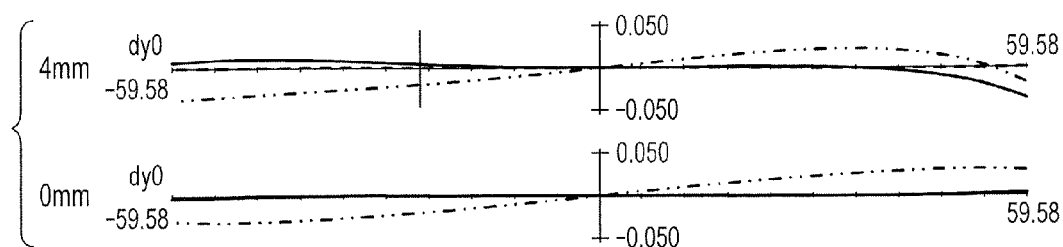
FIG. 5B is a lateral aberration diagram when focused on the object distance of 7 m at the telephoto end according to Embodiment 1.
Figure 5C:
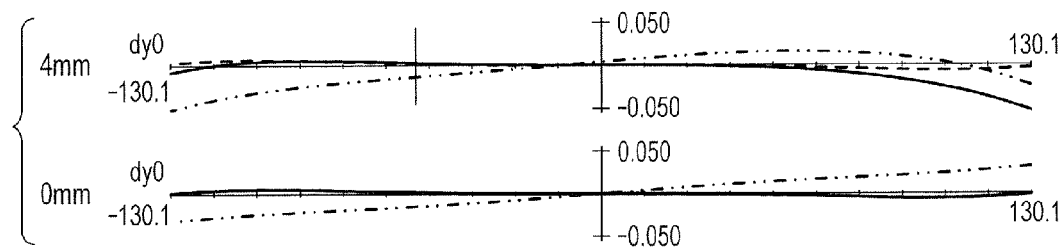
FIG. 5C is a lateral aberration diagram when focused on the object at the minimum distance at the telephoto end according to Embodiment 1.

FIGS. 1A and 1B illustrate the zoom lens according to Embodiment 1 (Numerical Embodiment 1) of the present invention, of which FIG. 1A is a lens cross-sectional view when focused on the object at infinity at a wide angle end, and FIG. 1B is a lens cross-sectional view when focused on the object at the minimum distance (2.5 m) at the wide angle end. FIG. 2 is a longitudinal aberration diagram when focused on the object at infinity at the wide angle end according to Numerical Embodiment 1. FIG. 3 is a longitudinal aberration diagram when focused on the object at infinity at a focal length of 60 mm according to Numerical Embodiment 1. FIGS. 4A, 4B, and 4C are longitudinal aberration diagrams at a telephoto end according to Numerical Embodiment 1, of which FIG. 4A is a longitudinal aberration diagram when focused on the object at infinity, FIG. 4B is a longitudinal aberration diagram when focused on an object distance of 7 m, and FIG. 4C is a longitudinal aberration diagram when focused on the object at the minimum distance. FIGS. 5A, 5B, and 5C are lateral aberration diagrams at a center and an image height of 4 mm at the telephoto end according to Numerical Embodiment 1, of which FIG. 5A is a lateral aberration diagram when focused on the object at infinity, FIG. 5B is a lateral aberration diagram when focused on the object distance of 7 m, and FIG. 5C is a lateral aberration diagram when focused on the object at the minimum distance. It should be noted, however, that the values of the focal lengths are values when expressed in mm of the numerical embodiment to be described later. The same applies to the subsequent numerical embodiments.

In FIG. 1, in order from the object side, there is provided the first lens unit (focus lens unit) U1 having the positive refractive power for focusing. Further, there is provided a second lens unit (variator) U2 having the negative refractive power for zooming which moves to the image side during zooming from the wide angle end to the telephoto end. Further, there is provided a third lens unit (compensator) U3 having the negative refractive power which moves non-linearly on the optical axis in conjunction with the movement of the second lens unit U2, and corrects an image plane variation accompanying the zooming. Further, there is provided a fourth lens unit (relay lens unit, imaging lens unit) U4 having the positive refractive power and an imaging action which does not move for zooming.

The second lens unit U2 and the third lens unit U3 constitute a zoom optical system. An aperture stop SP is disposed on the object side of the fourth lens unit U4. A color separation optical system or an optical filter P is represented as a glass block. An image plane IP corresponds to an image plane of a solid-state image pickup element.

In each longitudinal aberration diagram, spherical aberration is illustrated with respect to e-line (represented with a solid line) and g-line (represented with a chain double-dashed line). Further, astigmatism is illustrated on a meridional image plane (meri) (represented with a broken line) with respect to e-line and a sagittal image plane (Sagi) (represented with a solid line) with respect to e-line. In addition, lateral chromatic aberration is illustrated with respect to g-line (represented with a chain double-dashed line). An F-number is represented by Fno and a half angle of field is represented by ω. The lateral aberrations are illustrated on a meridional image plane (meri) (represented with a solid line) with respect to e-line, and a sagittal image plane (Sagi) (represented with a broken line) with respect to e-line, and g-line (represented with a chain double-dashed line).

In the longitudinal aberration diagram, spherical aberration, astigmatism, distortion, and lateral chromatic aberration are illustrated in scales of 0.4 mm, 0.4 mm, 5%, and 0.05 mm, respectively. The lateral aberration is illustrated in a scale of 0.05 mm. Note that, in the following embodiments, the wide angle end and the telephoto end are zoom positions where the second lens unit U2 for zooming is positioned at each end of the movable range on the optical axis with respect to the mechanism.

Now, a description is given of the first lens unit U1 according to this embodiment. The first lens unit U1 corresponds to the 1st to 14th surfaces. The first lens unit U1 includes the first sub lens unit U11 having the negative refractive power which does not move for focusing, the second sub lens unit U12 having the positive refractive power which moves to the image side during the focus adjustment from the object at infinity to the object at the short distance, and the third sub lens unit U13 having the positive refractive power which moves to the object side during the focus adjustment from the object at infinity to the object at the short distance. The first sub lens unit U11 includes, in order from the object side, a biconcave lens G1 and a meniscus convex lens G2 which is convex to the object side. The second sub lens unit U12 includes a biconvex lens G3, a meniscus concave lens G4 which is convex to the object side, and a biconvex lens G5. The third sub lens unit U13 includes a biconvex lens G6, and a meniscus convex lens G7 which is concave to the image side. The second lens unit U2 includes a total of five lenses including a convex lens and a concave lens. The third lens unit U3 includes a cemented lens formed by cementing a biconcave lens and a meniscus convex lens which is concave to the image side. The fourth lens unit U4 includes a total of ten lenses including a convex lens and a concave lens.

Numerical values corresponding to the respective conditional expressions of this embodiment are shown in Table 1. In addition, values obtained when the breathing of this embodiment is defined as a ratio of a length variation of the focal length of the entire system at the minimum distance at the wide angle end to the focal length of the entire system at the object distance of infinity at the wide angle end are shown in Table 2. This embodiment satisfies Conditional Expressions (1) to (8), and appropriately sets the configuration and a paraxial arrangement of the first lens unit and the amounts of movement of the second sub lens unit and the third sub lens unit during the focus adjustment to suppress the breathing at the wide angle end while satisfactorily correcting the focusing variations at the telephoto end. As a result, there is realized the zoom lens having the high optical performance over an entire zoom range and the entire focus range in which the breathing is little at the wide angle end.

[Embodiment 2]

Figure 6A:
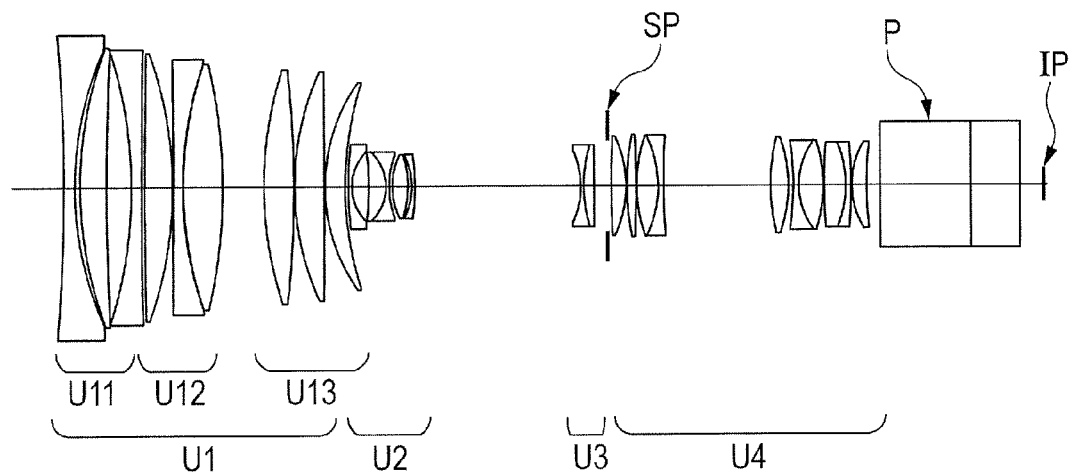
FIG. 6A is a lens cross-sectional view when focused on the object at infinity at the wide angle end according to Embodiment 2 of the present invention.
Figure 6B:
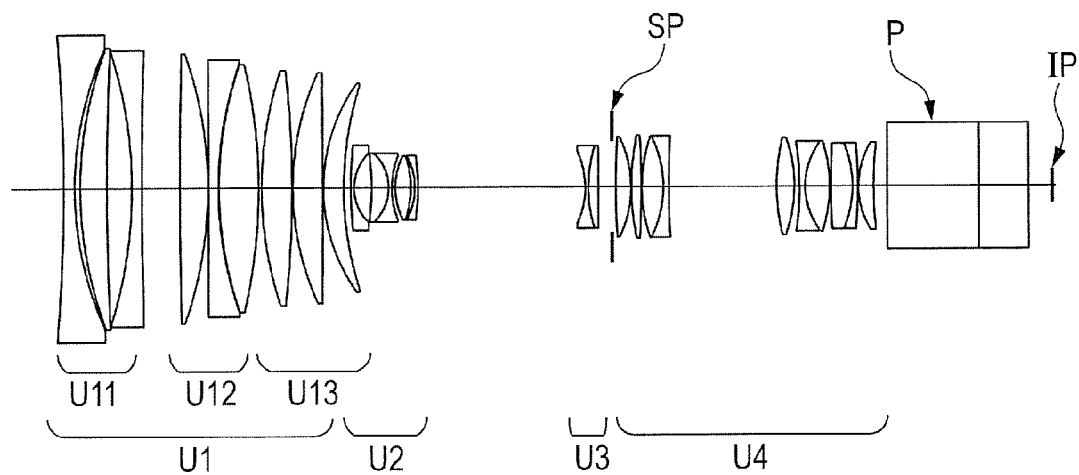
FIG. 6B is a lens cross-sectional view when focused on the object at the minimum distance (0.82 m) at the wide angle end according to Embodiment 2.
Figure 7:
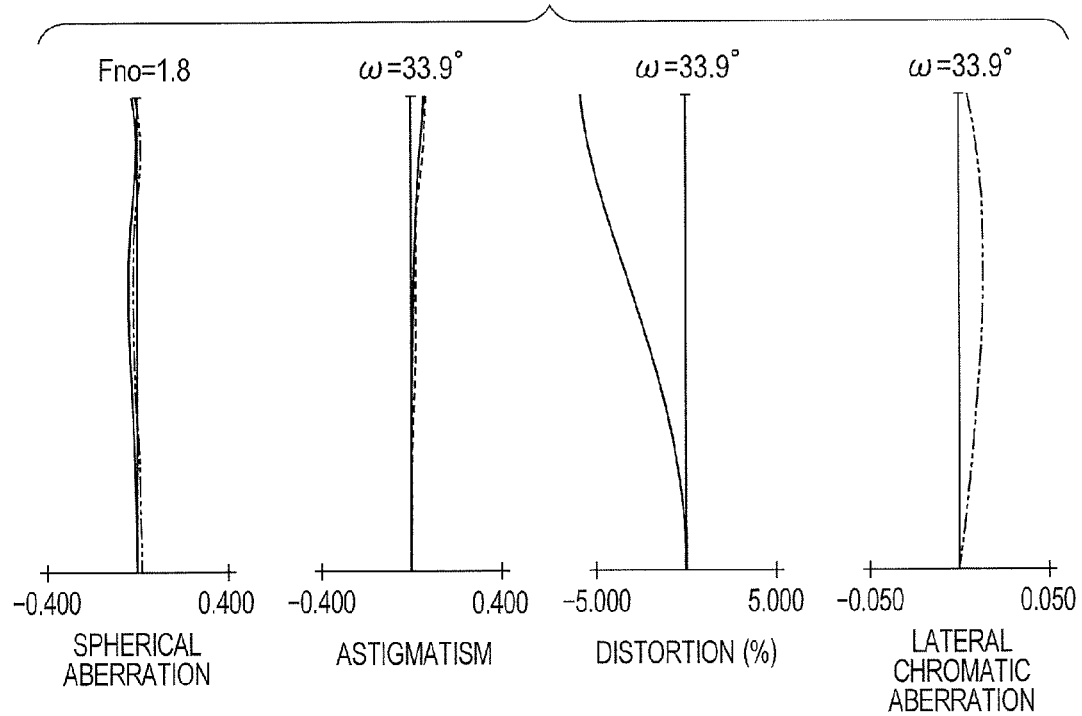
FIG. 7 is a longitudinal aberration diagram at the wide angle end according to Embodiment 2.
Figure 8:
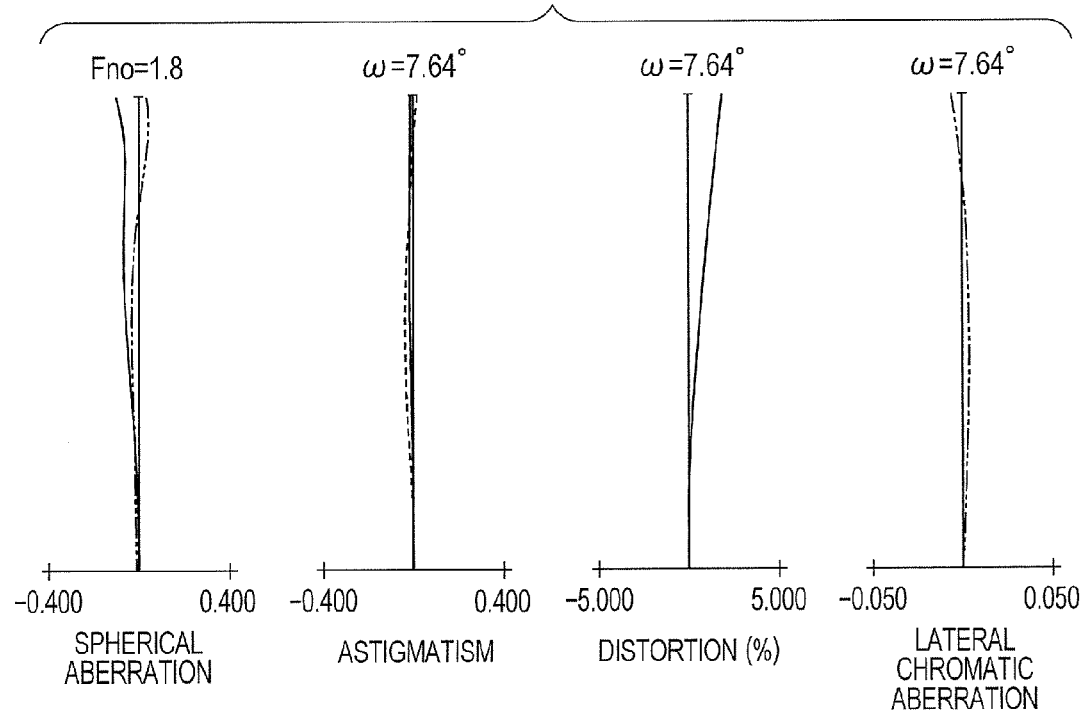
FIG. 8 is a longitudinal aberration diagram at a focal length of 41 mm according to Embodiment 2.
Figure 9A:
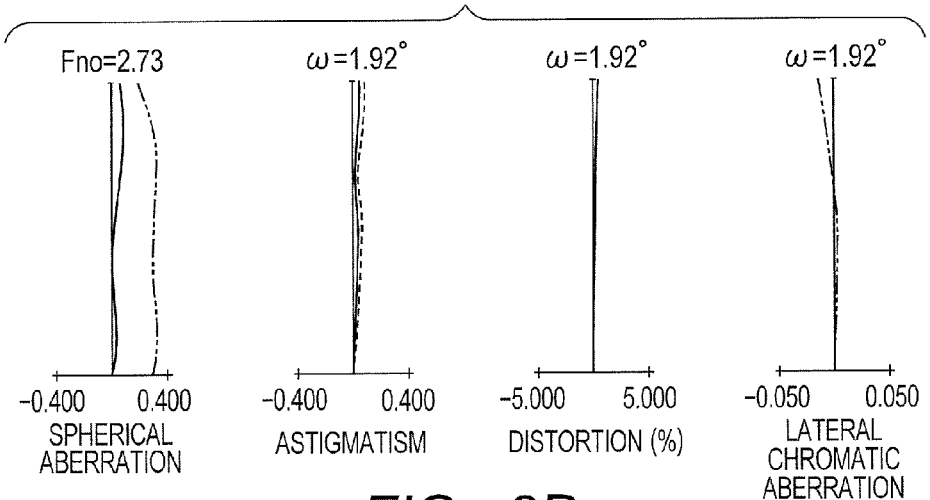
FIG. 9A is a longitudinal aberration diagram when focused on the object at infinity at the telephoto end according to Embodiment 2.
Figure 9B:
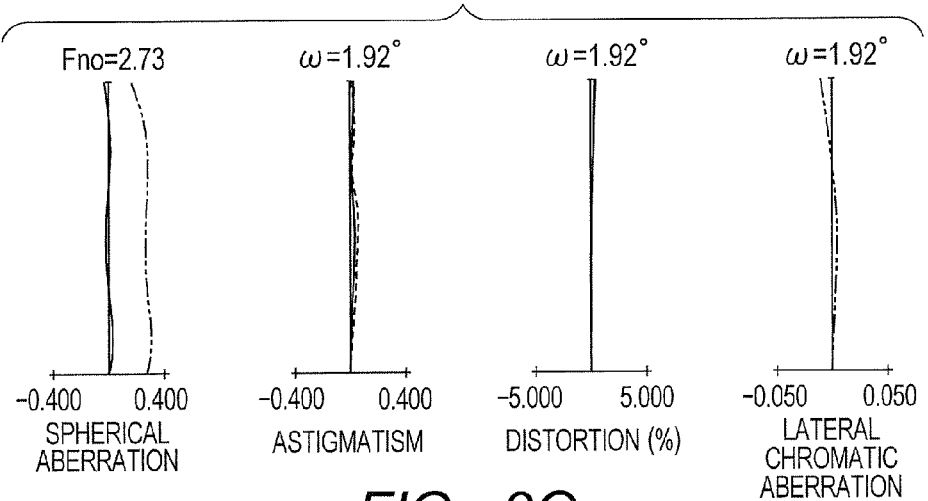
FIG. 9B is a longitudinal aberration diagram when focused on an object distance of 2.5 m at the telephoto end according to Embodiment 2.
Figure 9C:
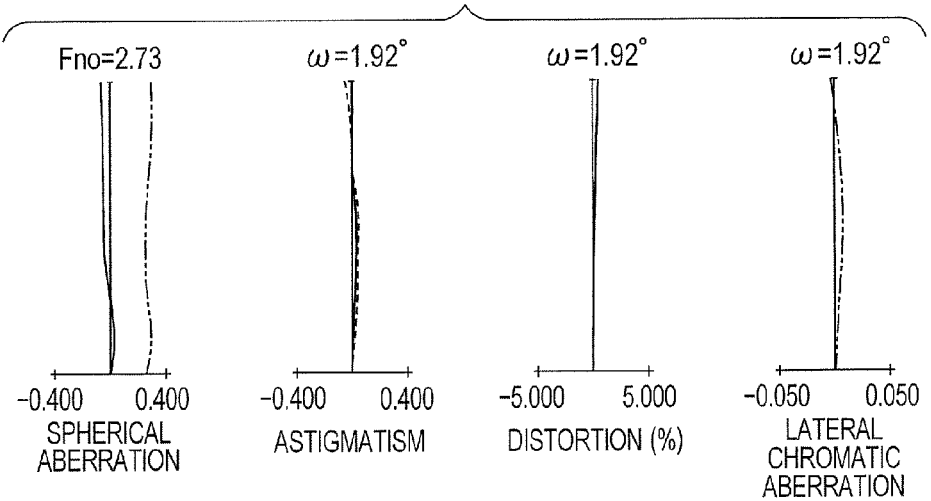
FIG. 9C is a longitudinal aberration diagram when focused on the object at the minimum distance at the telephoto end according to Embodiment 2.
Figure 10A:
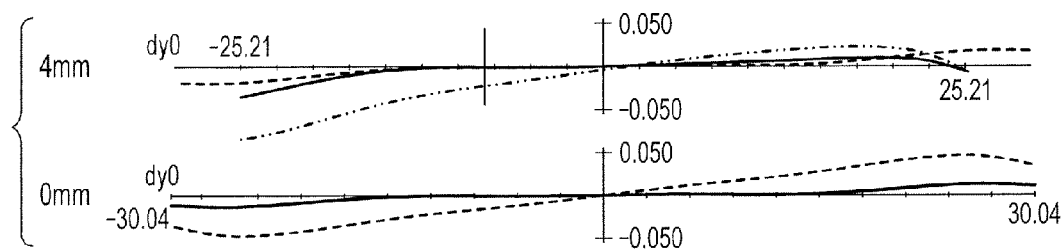
FIG. 10A is a lateral aberration diagram when focused on the object at infinity at the telephoto end according to Embodiment 2.
Figure 10B:
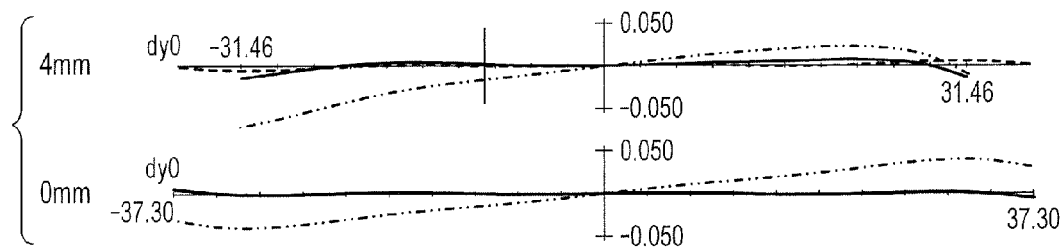
FIG. 10B is a lateral aberration diagram when focused on the object distance of 2.5 m at the telephoto end according to Embodiment 2.
Figure 10C:
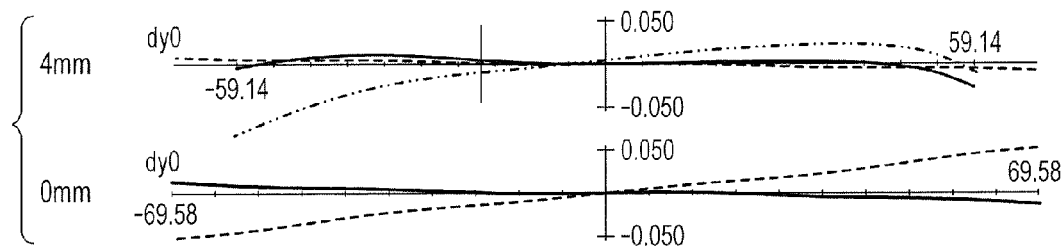
FIG. 10C is a lateral aberration diagram when focused on the object at the minimum distance at the telephoto end according to Embodiment 2.

FIGS. 6A and 6B illustrate a zoom lens according to Embodiment 2 (Numerical Embodiment 2) of the present invention, of which FIG. 6A is a lens cross-sectional view when focused on the object at infinity at a wide angle end, and FIG. 6B is a lens cross-sectional view when focused on the object at the minimum distance (0.82 m) at the wide angle end. FIG. 7 is a longitudinal aberration diagram when focused on the object at infinity at the wide angle end according to Numerical Embodiment 2. FIG. 8 is a longitudinal aberration diagram when focused on the object at infinity at a focal length of 41 mm according to Numerical Embodiment 2. FIGS. 9A, 9B, and 9C are longitudinal aberration diagrams at the telephoto end according to Numerical Embodiment 2, of which FIG. 9A is a longitudinal aberration diagram when focused on the object at infinity, FIG. 9B is a longitudinal aberration diagram when focused on an object distance of 2.5 m, and FIG. 9C is a longitudinal aberration diagram when focused on the object at the minimum distance. FIGS. 10A, 10B, and 10C are lateral aberration diagrams at a center and an image height of 4 mm at the telephoto end according to Numerical Embodiment 2, of which FIG. 10A is a lateral aberration diagram when focused on the object at infinity, FIG. 10B is a lateral aberration diagram when focused on the object distance of 2.5 m, and FIG. 10C is a lateral aberration diagram when focused on the object at the minimum distance.

In FIGS. 6A and 6B, in order from the object side, there is provided the first lens unit (focus lens unit) U1 having the positive refractive power for focusing. Further, there is provided a second lens unit (variator) U2 having the negative refractive power for zooming which moves to the image side during zooming from the wide angle end to the telephoto end. Further, there is provided a third lens unit (compensator) U3 having the negative refractive power which moves non-linearly on the optical axis in conjunction with the movement of the second lens unit U2, and corrects an image plane variation accompanying the zooming. Further, there is provided a fourth lens unit (relay lens unit, imaging lens unit) U4 having the positive refractive power and an imaging action which does not move for zooming.

Now, a description is given of the first lens unit U1 according to this embodiment. The first lens unit U1 corresponds to the 1st to 18th surfaces. The first lens unit U1 includes the first sub lens unit U11 having the negative refractive power which does not move for focusing, the second sub lens unit U12 having the positive refractive power which moves to the image side during the focus adjustment from the object at infinity to the object at the short distance, and the third sub lens unit U13 having the positive refractive power which moves to the object side during the focus adjustment from the object at infinity to the object at the short distance. The first sub lens unit U11 includes, in order from the object side, a biconcave lens G1, a meniscus convex lens G2 which is concave to the image side, and a biconcave lens G3. The second sub lens unit U12 includes a biconvex lens G4, a biconcave lens G5, and a biconvex lens G6. The third sub lens unit U13 includes a biconvex lens G7, a biconvex lens G8, and a meniscus convex lens G9 which is concave to the image side. The second lens unit U2 includes a total of five lenses including a convex lens and a concave lens. The third lens unit U3 includes a cemented lens formed by cementing a biconcave lens and a biconvex lens. The fourth lens unit U4 includes a total of ten lenses including a convex lens and a concave lens.

Numerical values corresponding to the respective conditional expressions of this embodiment are shown in Table 1. In addition, values obtained when the breathing of this embodiment is defined as a ratio of a length variation of the focal length of the entire system at the minimum distance at the wide angle end to the focal length of the entire system at the object distance of infinity at the wide angle end are shown in Table 2. This embodiment satisfies Conditional Expressions (1) to (8), and appropriately sets the configuration and a paraxial arrangement of the first lens unit and the amounts of movement of the second sub lens unit and the third sub lens unit during the focus adjustment to suppress the breathing at the wide angle end while satisfactorily correcting the focusing variations at the telephoto end. As a result, there is realized the zoom lens having the high optical performance over an entire zoom range and the entire focus area in which the breathing is little at the wide angle end.

[Embodiment 3]

Figure 11A:
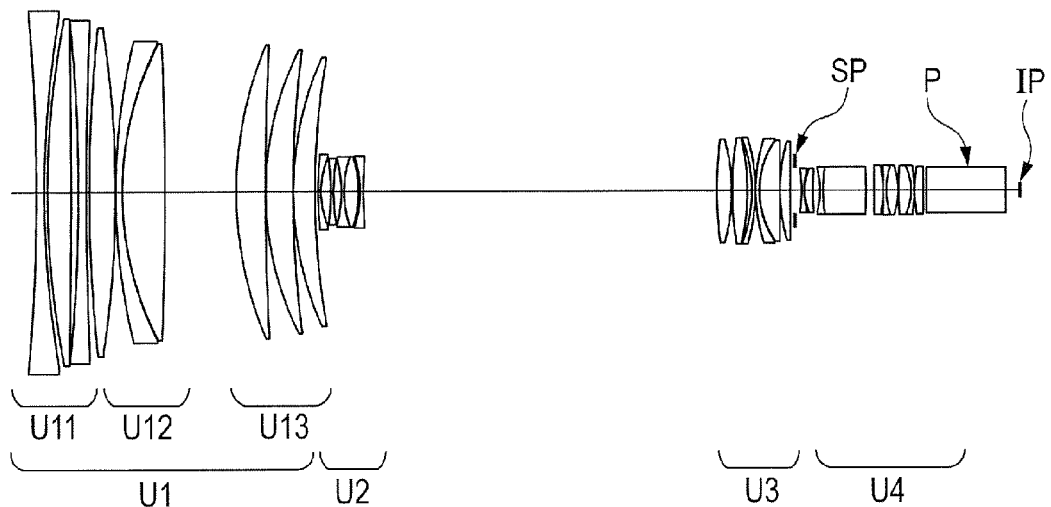
FIG. 11A is a lens cross-sectional view when focused on the object at infinity at the wide angle end according to Embodiment 3 of the present invention.
Figure 11B:
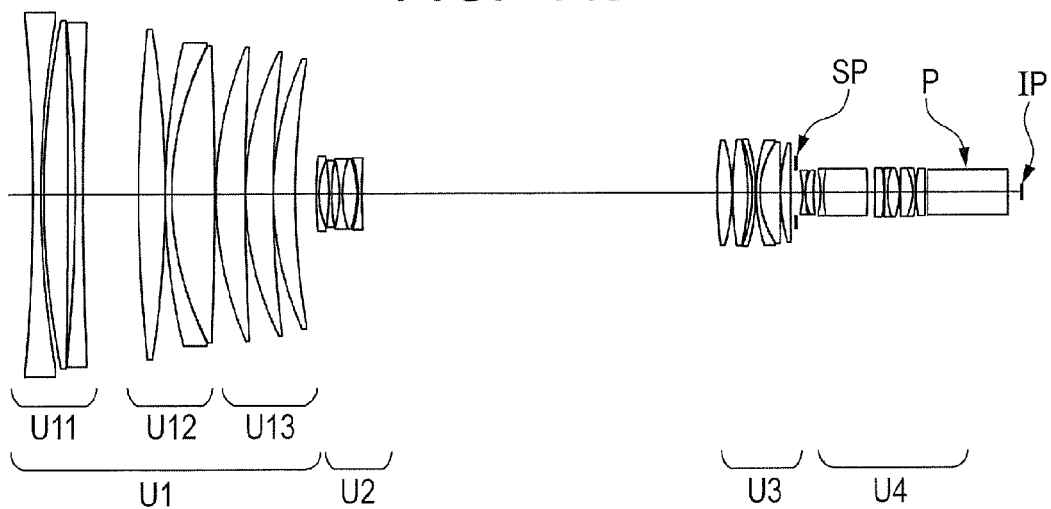
FIG. 11B is a lens cross-sectional view when focused on the object at the minimum distance (3.5 m) at the wide angle end according to Embodiment 3.
Figure 12:
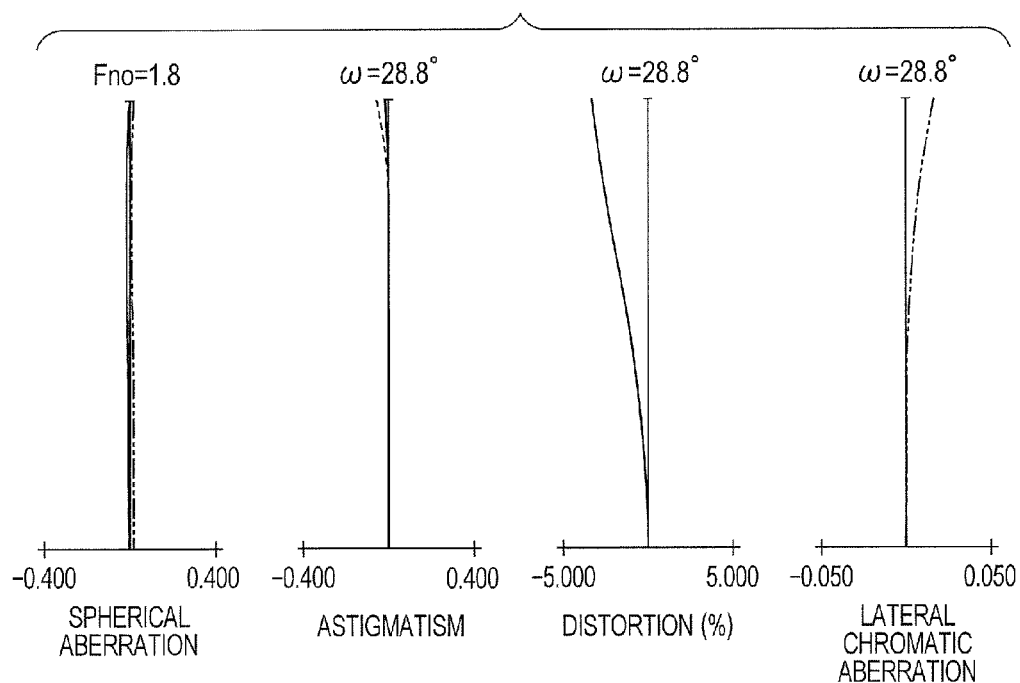
FIG. 12 is a longitudinal aberration diagram at the wide angle end according to Embodiment 3.
Figure 13:
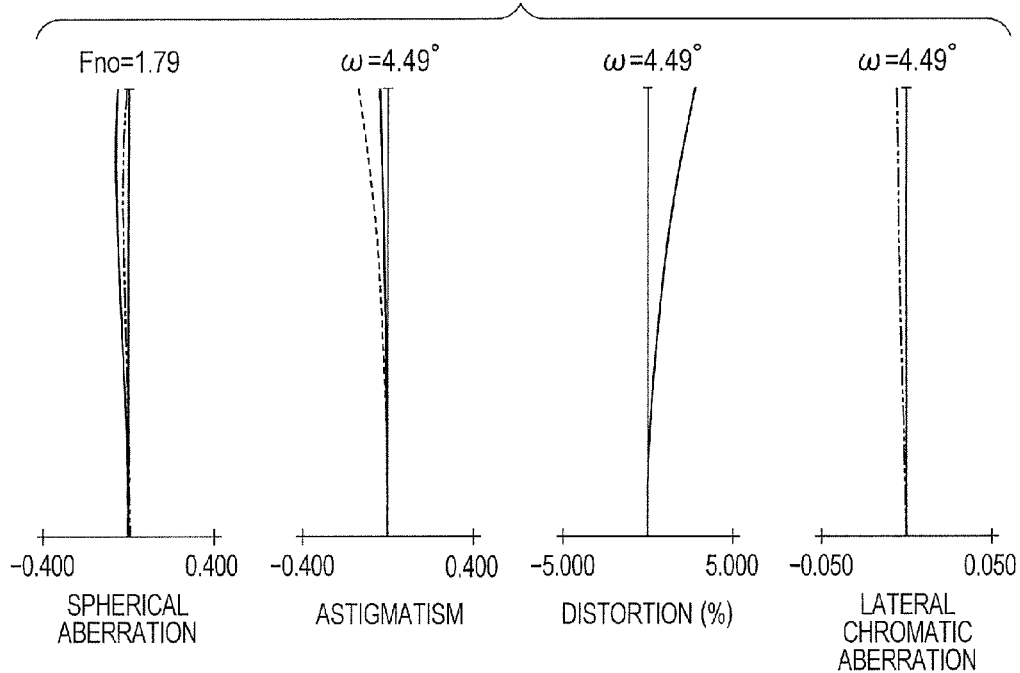
FIG. 13 is a longitudinal aberration diagram at a focal length of 70 mm according to Embodiment 3.
Figure 14A:
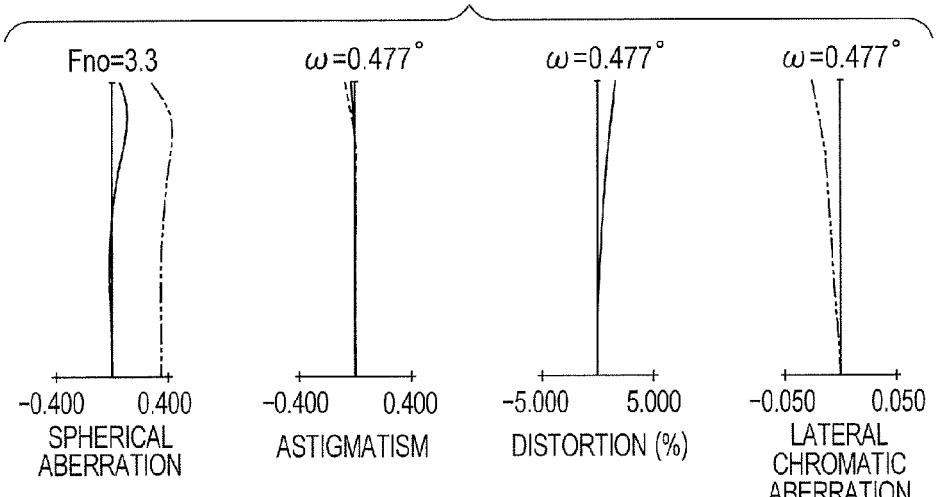
FIG. 14A is a longitudinal aberration diagram when focused on the object at infinity at the telephoto end according to Embodiment 3.
Figure 14B:
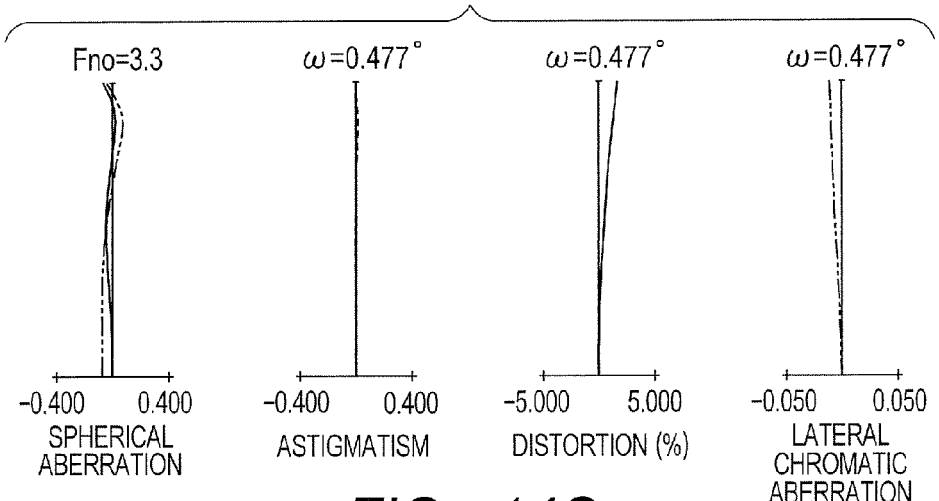
FIG. 14B is a longitudinal aberration diagram when focused on the object distance of 7 m at the telephoto end according to Embodiment 3.
Figure 14C:
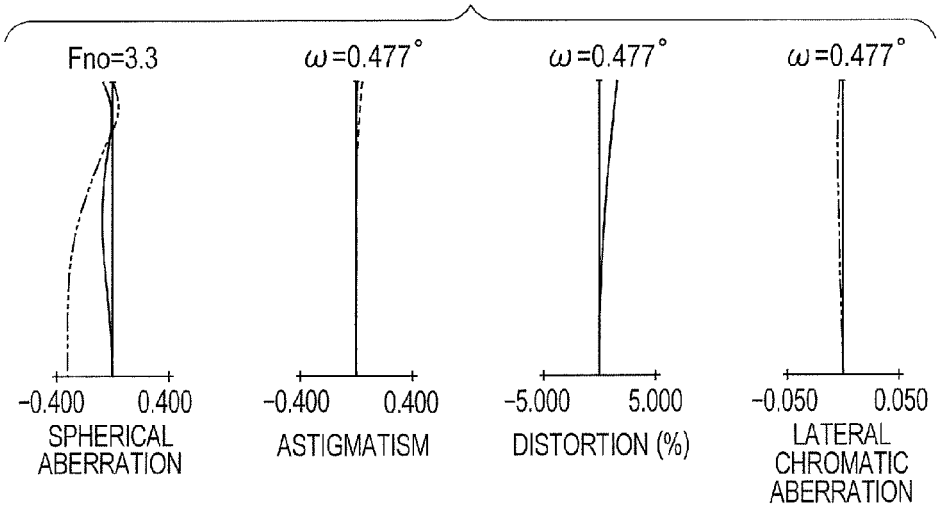
FIG. 14C is a longitudinal aberration diagram when focused on the object at the minimum distance at the telephoto end according to Embodiment 3.
Figure 15A:
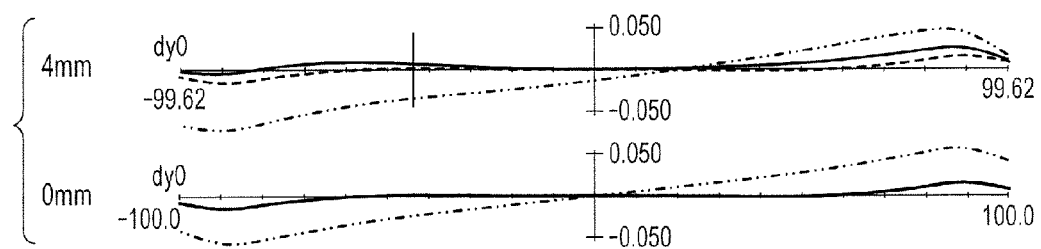
FIG. 15A is a lateral aberration diagram when focused on the object at infinity at the telephoto end according to Embodiment 3.
Figure 15B:
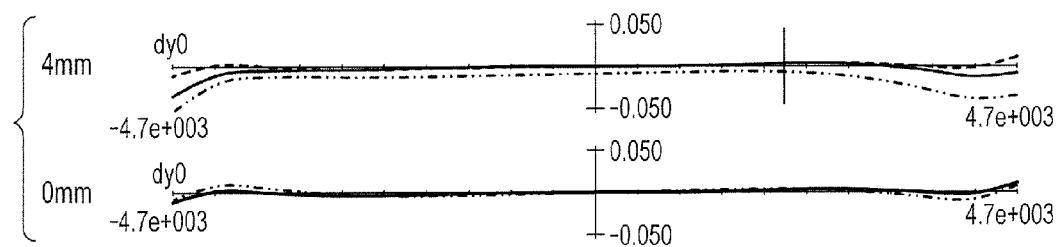
FIG. 15B is a lateral aberration diagram when focused on the object distance of 7 m at the telephoto end according to Embodiment 3.
Figure 15C:
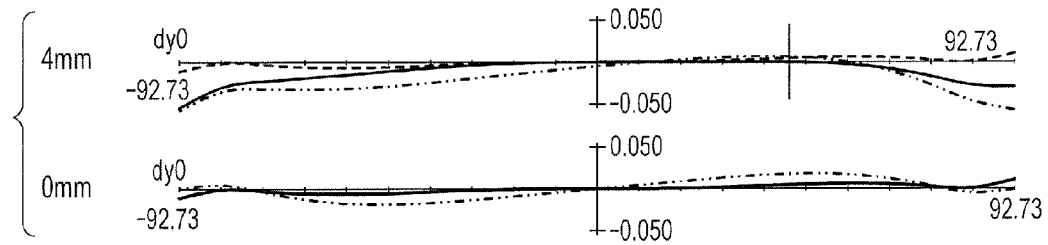
FIG. 15C is a lateral aberration diagram when focused on the object at the minimum distance at the telephoto end according to Embodiment 3.

FIGS. 11A and 11B illustrate a zoom lens according to Embodiment 3 (Numerical Embodiment 3) of the present invention, of which FIG. 11A is a lens cross-sectional view when focused on the object at infinity at a wide angle end, and FIG. 11B is a lens cross-sectional view when focused on the object at the minimum distance (3.5 m) at the wide angle end. FIG. 12 is a longitudinal aberration diagram when focused on the object at infinity at the wide angle end according to Numerical Embodiment 3. FIG. 13 is a longitudinal aberration diagram when focused on the object at infinity at a focal length of 70 mm according to Numerical Embodiment 3. FIGS. 14A, 14B, and 14C are longitudinal aberration diagrams at the telephoto end according to Numerical Embodiment 3, of which FIG. 14A is a longitudinal aberration diagram when focused on the object at infinity, FIG. 14B is a longitudinal aberration diagram when focused on an object distance of 7 m, and FIG. 14C is a longitudinal aberration diagram when focused on the object at the minimum distance. FIGS. 15A, 15B, and 15C are lateral aberration diagrams at a center and an image height of 4 mm at the telephoto end according to Numerical Embodiment 3, of which FIG. 15A is a lateral aberration diagram when focused on the object at infinity, FIG. 15B is a lateral aberration diagram when focused on the object distance of 7 m, and FIG. 15C is a lateral aberration diagram when focused on the object at the minimum distance.

In FIGS. 11A and 11B, in order from the object side, there is provided the first lens unit (focus lens unit) U1 having the positive refractive power for focusing. Further, there is provided a second lens unit (variator) U2 having the negative refractive power for zooming which moves to the image side during zooming from the wide angle end to the telephoto end. Further, there is provided a third lens unit (compensator) U3 having the positive refractive power which moves non-linearly on the optical axis in conjunction with the movement of the second lens unit U2, and corrects an image plane variation accompanying the zooming. Further, there is provided a fourth lens unit (relay lens unit, imaging lens unit) U4 having the positive refractive power and an imaging action which does not move for zooming.

Now, a description is given of the first lens unit U1 according to this embodiment. The first lens unit U1 corresponds to the 1st to 18th surfaces. The first lens unit U1 includes the first sub lens unit U11 having the negative refractive power which does not move for focusing, the second sub lens unit U12 having the positive refractive power which moves to the image side during the focus adjustment from the object at infinity to the object at the short distance, and the third sub lens unit U13 having the positive refractive power which moves to the object side during the focus adjustment from the object at infinity to the object at the short distance. The first sub lens unit U11 includes, in order from the object side, a biconcave lens G1, a biconvex lens G2, and a biconcave lens G3. The second sub lens unit U12 includes a biconvex lens G4, a meniscus concave lens G5 which is convex to the object side, and a biconvex lens G6. The third sub lens unit U13 includes a meniscus convex lens G7 which is concave to the image side, a meniscus convex lens G8 which is concave to the image side, and a meniscus convex lens G9 which is concave to the image side. The second lens unit U2 includes a total of five lenses including a convex lens and a concave lens. The third lens unit U3 includes total of six lenses including a convex lens and a concave lens. The fourth lens unit U4 includes a total of ten lenses including a convex lens and a concave lens.

Numerical values corresponding to the respective conditional expressions of this embodiment are shown in Table 1. In addition, values obtained when the breathing of this embodiment is defined as a ratio of a length variation of the focal length of the entire system at the minimum distance at the wide angle end to the focal length of the entire system at the object distance of infinity at the wide angle end are shown in Table 2. This embodiment satisfies Conditional Expressions (1) to (8), and appropriately sets the configuration and a paraxial arrangement of the first lens unit and the amounts of movement of the second sub lens unit and the third sub lens unit during the focus adjustment to suppress the breathing at the wide angle end while satisfactorily correcting the focusing variations at the telephoto end. As a result, there is realized the zoom lens having the high optical performance over an entire zoom range and the entire focus range in which the breathing is little at the wide angle end.

[Embodiment 4]

Figure 16A:
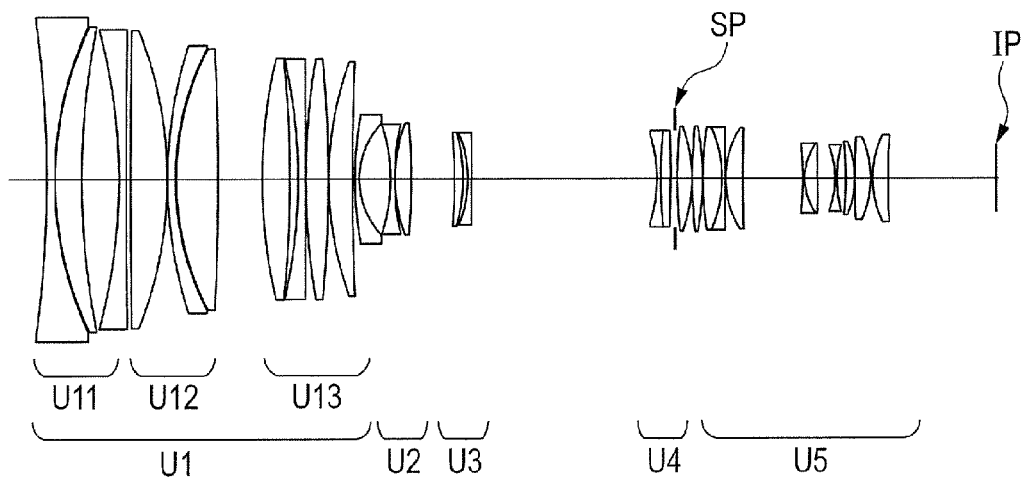
FIG. 16A is a lens cross-sectional view when focused on the object at infinity at the wide angle end according to Embodiment 4 of the present invention.
Figure 16B:
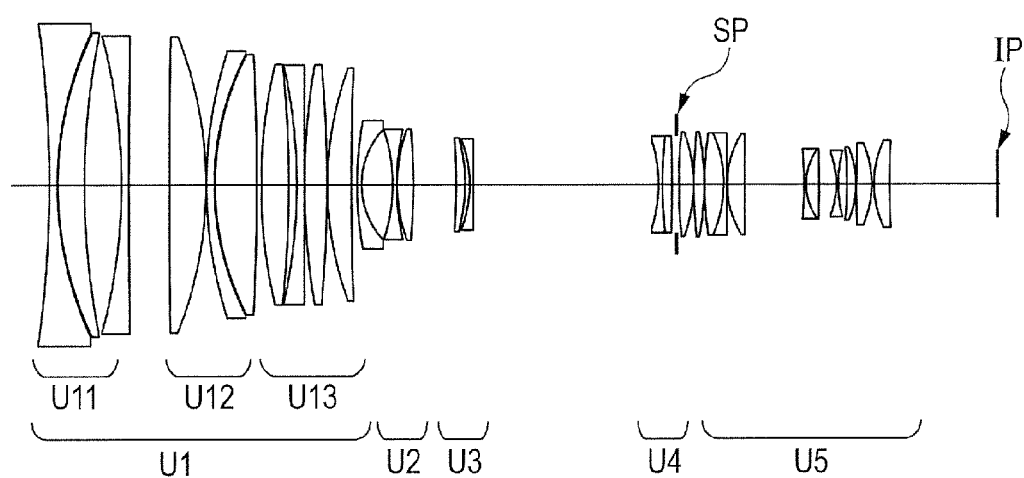
FIG. 16B is a lens cross-sectional view when focused on the object at the minimum distance (1.5 m) at the wide angle end according to Embodiment 4.
Figure 17:
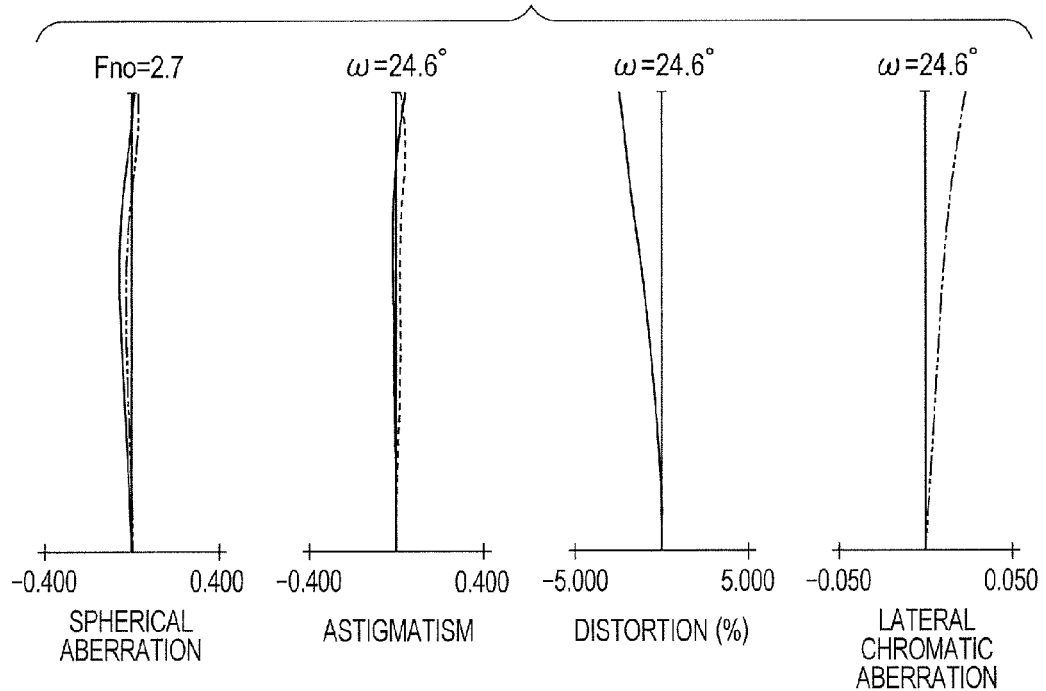
FIG. 17 is a longitudinal aberration diagram at the wide angle end according to Embodiment 4.
Figure 18:
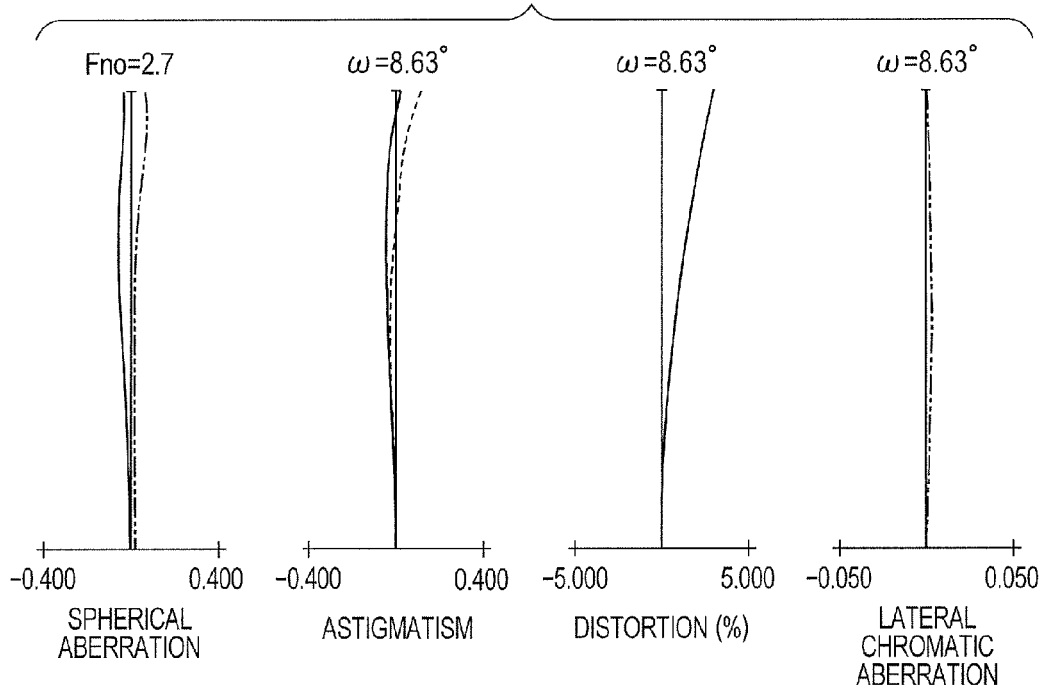
FIG. 18 is a longitudinal aberration diagram at a focal length of 102 mm according to Embodiment 4.
Figure 19A:
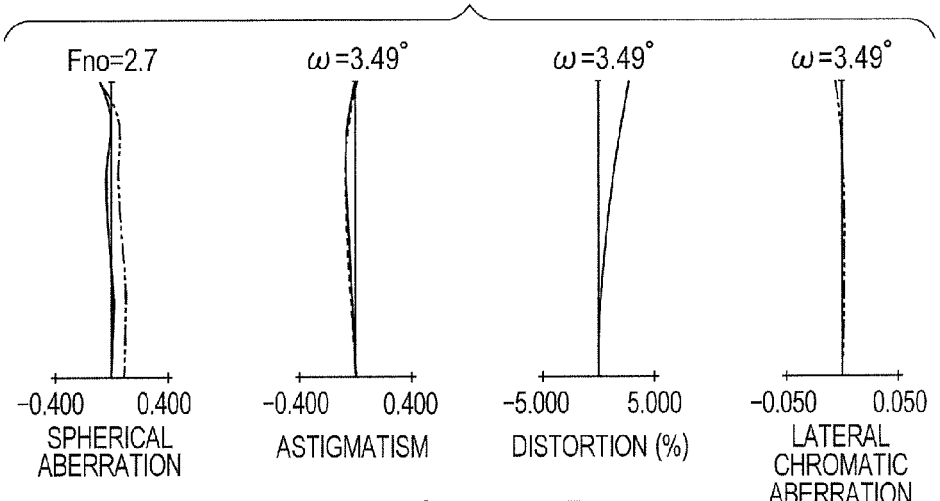
FIG. 19A is a longitudinal aberration diagram when focused on the object at infinity at the telephoto end according to Embodiment 4.
Figure 19B:
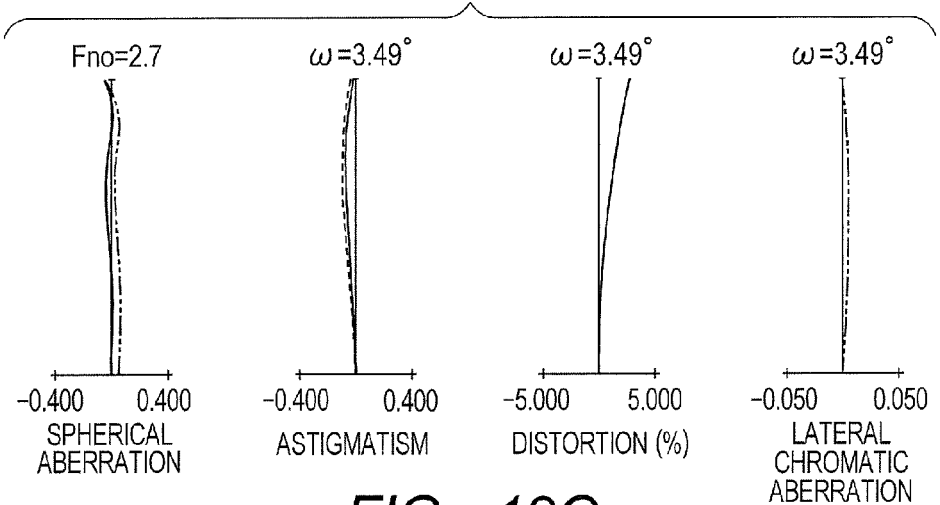
FIG. 19B is a longitudinal aberration diagram when focused on the object distance of 7 m at the telephoto end according to Embodiment 4.
Figure 19C:
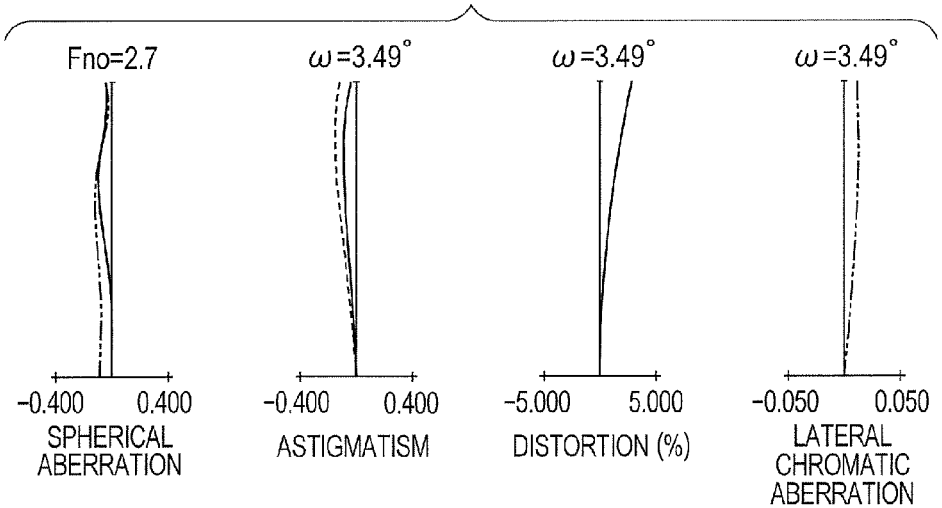
FIG. 19C is a longitudinal aberration diagram when focused on the object at the minimum distance at the telephoto end according to Embodiment 4.
Figure 20A:
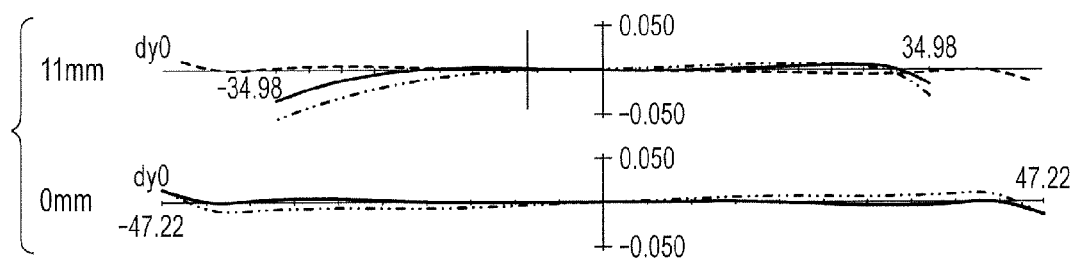
FIG. 20A is a lateral aberration diagram when focused on the object at infinity at the telephoto end according to Embodiment 4.
Figure 20B:
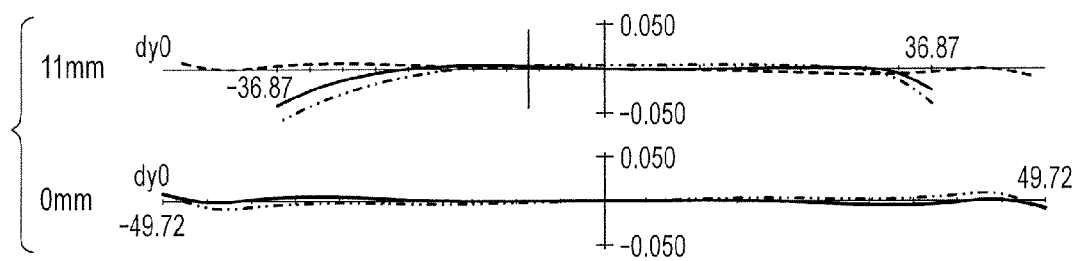
FIG. 20B is a lateral aberration diagram when focused on the object distance of 7 m at the telephoto end according to Embodiment 4.
Figure 20C:
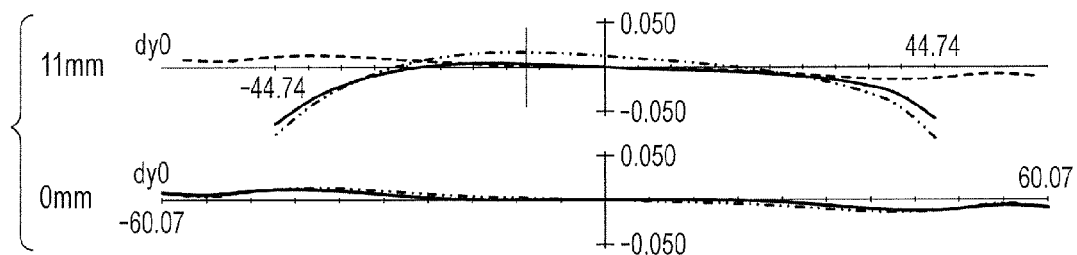
FIG. 20C is a lateral aberration diagram when focused on the object at the minimum distance at the telephoto end according to Embodiment 4.

FIGS. 16A and 16B illustrate a zoom lens according to Embodiment 4 (Numerical Embodiment 4) of the present invention, of which FIG. 16A is a lens cross-sectional view when focused on the object at infinity at a wide angle end, and FIG. 16B is a lens cross-sectional view when focused on the object at the minimum distance (1.5 m) at the wide angle end. FIG. 17 is a longitudinal aberration diagram when focused on the object at infinity at the wide angle end according to Numerical Embodiment 4. FIG. 18 is a longitudinal aberration diagram when focused on the object at infinity at a focal length of 102 mm according to Numerical Embodiment 4. FIGS. 19A, 19B, and 19C are longitudinal aberration diagrams at the telephoto end according to Numerical Embodiment 4, of which FIG. 19A is a longitudinal aberration diagram when focused on the object at infinity, FIG. 19B is a longitudinal aberration diagram when focused on an object distance of 7 m, and FIG. 19C is a longitudinal aberration diagram when focused on the object at the minimum distance. FIGS. 20A, 20B, and 20C are lateral aberration diagrams at a center and an image height of 11 mm at the telephoto end according to Numerical Embodiment 4, of which FIG. 20A is a lateral aberration diagram when focused on the object at infinity, FIG. 20B is a lateral aberration diagram when focused on the object distance of 7 m, and FIG. 20C is a lateral aberration diagram when focused on the object at the minimum distance.

In FIGS. 16A and 16B, in order from the object side, there is provided the first lens unit (focus lens unit) U1 having the positive refractive power for focusing. Further, there are provided a second lens unit (first variator) U2 having the negative refractive power for zooming and a third lens unit U3 (second variator) having the negative refractive power for zooming, which move to the image side during zooming from the wide angle end to the telephoto end. Further, there is provided a fourth lens unit (compensator) U4 having the negative refractive power which moves non-linearly on the optical axis in conjunction with the movement of the second lens unit U2 and the third lens unit U3, and corrects an image plane variation accompanying the zooming. Further, there is provided a fifth lens unit (relay lens unit, imaging lens unit) U5 having the positive refractive power and an imaging action which does not move for zooming. Note that, the third lens unit U3 may be the compensator, and the fourth lens unit U4 may be the second variator.

Now, a description is given of the first lens unit U1 according to this embodiment. The first lens unit U1 corresponds to the 1st to 20th surfaces. The first lens unit U1 includes the first sub lens unit U11 having the negative refractive power which does not move for focusing, the second sub lens unit U12 having the positive refractive power which moves to the image side during the focus adjustment from the object at infinity to the object at the short distance, and the third sub lens unit U13 having the positive refractive power which moves to the object side during the focus adjustment from the object at infinity to the object at the short distance. The first sub lens unit U11 includes, in order from the object side, a biconcave lens G1, a meniscus convex lens G2 which is concave to the image side, and a biconcave lens G3. The second sub lens unit U12 includes a biconvex lens G4, a meniscus concave lens G5 which is convex to the object side, and a biconvex lens G6. The third sub lens unit U13 includes a biconvex lens G7, a planoconcave lens G8, a biconvex lens G9 and a meniscus convex lens G10 which is concave to the image side. The second lens unit U2 includes a total of three lenses including a convex lens and a concave lens. The third lens unit U3 includes one convex lens and one concave lens. The fourth lens unit U4 includes a cemented lens formed by cementing a biconcave lens and a biconvex lens. The fifth lens unit U5 includes a total of ten lenses including a convex lens and a concave lens.

Numerical values corresponding to the respective conditional expressions of this embodiment are shown in Table 1. In addition, values obtained when the breathing of this embodiment is defined as a ratio of a length variation of the focal length of the entire system at the minimum distance at the wide angle end to the focal length of the entire system at the object distance of infinity at the wide angle end are shown in Table 2. This embodiment satisfies Conditional Expressions (1) to (8), and appropriately sets the configuration and a paraxial arrangement of the first lens unit and the amounts of movement of the second sub lens unit and the third sub lens unit during the focus adjustment to suppress the breathing at the wide angle end while satisfactorily correcting the focusing variations at the telephoto end. As a result, there is realized the zoom lens having the high optical performance over an entire zoom range and the entire focus range in which the breathing is little at the wide angle end.

(Image Pickup Apparatus)

Figure 21:
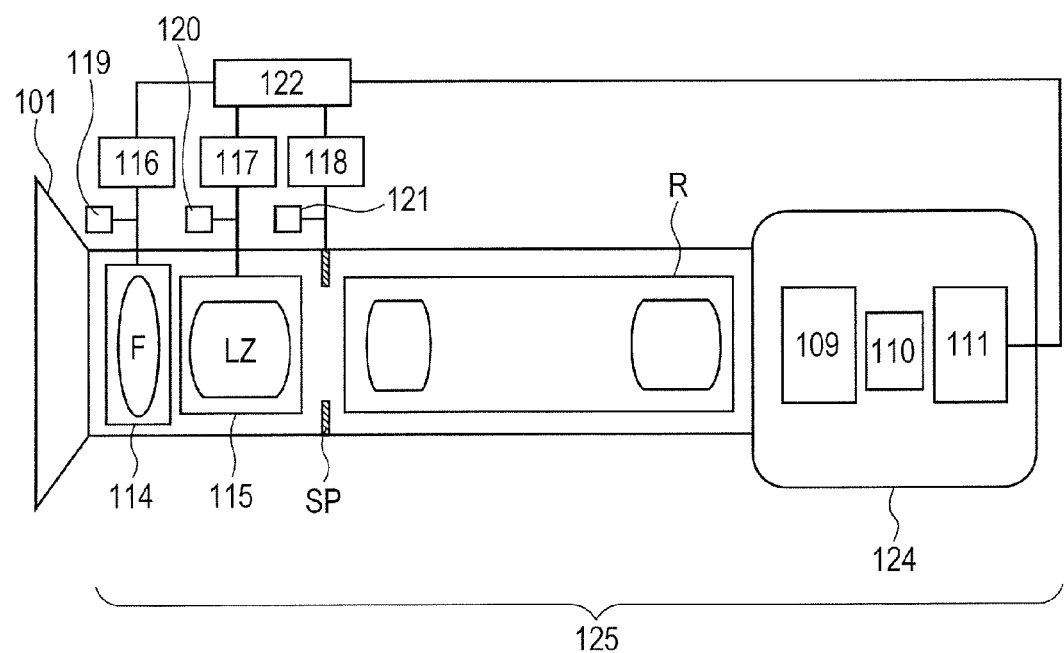
FIG. 21 is a schematic diagram of an image pickup apparatus according to the present invention.

FIG. 21 is a schematic diagram of an image pickup apparatus (television camera system) using the zoom lens according to each of Embodiments of the present invention as a photographing optical system. In FIG. 21, an image pickup apparatus 125 includes a zoom lens 101 according to any one of Embodiments 1 to 4, and a camera 124. The zoom lens 101 is removably attached to the camera 124. The camera 124 attached with the zoom lens 101 constitutes the image pickup apparatus 125. The zoom lens 101 includes a first lens unit F, a zoom lens portion LZ, and a fourth lens unit R for imaging. The first lens unit F includes a lens unit for focusing. The zoom portion LZ includes the second lens unit which moves on the optical axis for zooming, and the third lens unit which moves on the optical axis for correcting the image plane variation accompanying the zooming. The aperture stop is denoted by SP. Drive mechanisms 114 and 115, such as a helicoid and a cam, drive the first lens unit F and the zoom lens portion LZ in an optical axis direction, respectively. Motors (drive units) 116 to 118 electrically drive the drive mechanisms 114 and 115 and the aperture stop SP. Detectors 119 to 121, such as an encoder, a potentiometer, or a photo-sensor, are configured to detect the positions of the first lens unit F and the zoom lens portion LZ on the optical axis, and the aperture diameter of the aperture stop SP. The camera 124 includes a glass block 109, which corresponds to an optical filter or a color separation optical system provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control the driving of the camera 124 and the zoom lens 101.

By applying the zoom lens according to the present invention to a television camera as described above, an image pickup apparatus having a high optical performance may be realized.

The exemplary embodiments of the present invention are described above, but the present invention is not limited to these embodiments and can be modified and changed variously within the scope of the gist thereof.

(Numerical Embodiments)

Next, Numerical Embodiments 1 to 4, respectively corresponding to Embodiments 1 to 4 of the present invention, are shown below. In each of the numerical embodiments, "i" represents the order of a surface from the object side, "ri" represents a radius of curvature of an i-th surface from the object side, "di" represents an interval between the i-th surface and the (i+1)th surface from the object side, and "ndi" and "udi" respectively represent a refractive index and an Abbe number of the i-th optical material. "BF" represents an air-equivalent back focus. The final three surfaces include a glass block such as a filter.

The aspherical shape is expressed in the following expression where an X axis corresponds to the optical axis, an H axis corresponds to an axis perpendicular to the optical axis, a travelling direction of light corresponds to a positive direction, "R" represents a paraxial radius of curvature, "k" represents a conic constant, and each of "A4", "A6", "A8", "A10", "A12", "A3", "A5", "A7", "A9", and "A11" represents an aspherical coefficient. Further, "e-Z" means "x10$^{-Z}$".

$$X = \frac{H^2/R}{1+\sqrt{1-(1+k)(H/R)^2}} + A4 \times H^4 + A6 \times H^6 + A8 \times H^8 + A10 \times H^{10} + A12 \times H^{12} + A3 \times H^3 + A5 \times H^5 + A7 \times H^7 + A9 \times H^9 + A11 \times H^{11}$$

(Numerical Embodiment 1)

Unit: mm

Surface data

| Surface number | r | d | nd | vd | Effective diameter |
|---|---|---|---|---|---|
| 1 | −603.508 | 4.00 | 1.77250 | 49.6 | 118.10 |
| 2 | 203.980 | 1.00 | | | 114.11 |
| 3 | 190.378 | 9.22 | 1.78472 | 25.7 | 114.39 |
| 4 | 458.902 | 2.00 | | | 113.67 |
| 5 | 639.893 | 10.65 | 1.59522 | 67.7 | 113.54 |
| 6 | −376.889 | 0.12 | | | 112.97 |
| 7 | 430.923 | 2.68 | 1.78472 | 25.7 | 109.73 |
| 8 | 139.312 | 2.08 | | | 106.56 |
| 9 | 146.759 | 16.47 | 1.43387 | 95.1 | 106.66 |
| 10 | −415.710 | 22.03 | | | 106.08 |
| 11 | 146.303 | 12.00 | 1.43387 | 95.1 | 97.39 |
| 12 | −2020.069 | 0.12 | | | 96.35 |
| 13 | 101.079 | 10.07 | 1.59240 | 68.3 | 90.70 |
| 14 | 248.174 | (Variable) | | | 88.83 |
| 15 | 130.159 | 1.00 | 1.81600 | 46.6 | 31.32 |
| 16 | 18.584 | 6.82 | | | 26.18 |
| 17 | −101.467 | 6.48 | 1.80518 | 25.4 | 26.02 |
| 18 | −17.851 | 1.00 | 1.81600 | 46.6 | 25.98 |
| 19 | 113.153 | 0.25 | | | 25.86 |
| 20 | 29.904 | 6.97 | 1.56732 | 42.8 | 26.27 |
| 21 | −60.402 | 1.00 | 1.88300 | 40.8 | 25.63 |
| 22 | 134.809 | (Variable) | | | 25.24 |
| 23 | −45.021 | 1.00 | 1.79952 | 42.2 | 29.78 |
| 24 | 57.410 | 3.41 | 1.92286 | 21.3 | 32.22 |
| 25 | 897.958 | (Variable) | | | 32.65 |
| 26 (stop) | ∞ | 1.30 | | | 35.61 |
| 27 | 1384.436 | 5.25 | 1.62041 | 60.3 | 36.66 |
| 28 | −51.145 | 0.20 | | | 37.34 |
| 29 | 110.521 | 4.21 | 1.51823 | 58.9 | 38.49 |
| 30 | −161.931 | 0.20 | | | 38.51 |
| 31 | 43.436 | 9.10 | 1.48749 | 70.2 | 37.93 |
| 32 | −61.248 | 1.50 | 1.83400 | 37.2 | 37.24 |
| 33 | 91.884 | 42.50 | | | 36.17 |
| 34 | −9205.397 | 4.94 | 1.51823 | 58.9 | 36.91 |
| 35 | −54.256 | 0.70 | | | 36.94 |
| 36 | 68.482 | 1.50 | 1.79952 | 42.2 | 34.62 |
| 37 | 29.516 | 6.45 | 1.51823 | 59.0 | 32.76 |
| 38 | 188.141 | 0.33 | | | 32.13 |
| 39 | 33.043 | 7.87 | 1.48749 | 70.2 | 30.92 |
| 40 | −67.049 | 1.50 | 1.78590 | 44.2 | 29.56 |
| 41 | 122.181 | 3.87 | | | 28.05 |
| 42 | −148.214 | 2.04 | 1.51823 | 58.9 | 26.93 |
| 43 | −125.866 | 5.50 | | | 26.68 |
| 44 | ∞ | 37.50 | 1.60342 | 38.0 | 30.00 |
| 45 | ∞ | 20.25 | 1.51633 | 64.2 | 30.00 |
| 46 | ∞ | (Variable) | | | 30.00 |
| Image surface | ∞ | | | | |

Various data
Zoom ratio 35.00

| | Wide angle | Intermediate | Telephoto |
|---|---|---|---|
| Focal length | 10.00 | 60.00 | 350.00 |
| F-number | 2.00 | 1.99 | 3.80 |
| Half angle of field | 28.81 | 5.24 | 0.90 |
| Image height | 5.50 | 5.50 | 5.50 |
| Total lens length | 408.09 | 408.09 | 408.09 |
| BF | 8.55 | 8.55 | 8.55 |
| d14 | 0.99 | 81.50 | 108.42 |
| d22 | 117.47 | 26.70 | 13.11 |
| d25 | 4.00 | 14.26 | 0.92 |
| d46 | 8.55 | 8.55 | 8.55 |
| Entrance pupil position | 93.01 | 478.33 | 1735.35 |
| Exit pupil position | −370.92 | −370.92 | −370.92 |
| Front principal point position | 102.74 | 528.84 | 1762.53 |
| Rear principal point position | −1.45 | −51.45 | −341.45 |

Zoom lens unit data

| Unit | Leading surface | Focal length | Lens structure length | Front principal point position | Rear principal point position |
|---|---|---|---|---|---|
| 1 | 1 | 140.00 | 92.43 | 58.89 | −6.20 |
| 2 | 15 | −20.00 | 23.52 | 2.81 | −12.46 |
| 3 | 23 | −60.00 | 4.41 | 0.07 | −2.25 |
| 4 | 26 | 55.07 | 156.72 | 45.04 | −123.55 |

Amounts of movement of the second sub unit and the third sub unit during focusing (the direction from the object side toward the image side corresponds to the positive direction)

| Unit | Infinity | 7.0 m | Minimum distance (2.5 m) |
|---|---|---|---|
| Second sub unit | 0 | 5.42 | 14.65 |
| Third sub unit | 0 | −2.00 | −5.39 |

(Numerical Embodiment 2)

Unit: mm

Surface data

| Surface number | r | d | nd | vd | Effective diameter |
|---|---|---|---|---|---|
| 1 | −593.477 | 3.60 | 1.81600 | 46.6 | 97.75 |
| 2 | 113.042 | | | | 1.78 |
| 3 | 131.521 | 8.70 | 1.75520 | 27.5 | 89.11 |
| 4 | 904.592 | | | | 8.19 |
| 5 | −147.766 | 3.30 | 1.69680 | 55.5 | 87.69 |
| 6 | 2179.105 | | | | 1.00 |
| 7 | 1791.356 | 9.17 | 1.59522 | 67.7 | 85.47 |
| 8 | −132.513 | | | | 0.18 |
| 9 | −7084.822 | 3.20 | 1.80518 | 25.4 | 81.24 |
| 10 | 124.505 | | | | 0.20 |
| 11 | 126.663 | 12.97 | 1.49700 | 81.5 | 79.74 |
| 12 | −176.813 | | | | 13.54 |
| 13 | 125.703 | 9.91 | 1.43387 | 95.1 | 75.71 |
| 14 | −345.742 | | | | 0.20 |
| 15 | 91.604 | 9.81 | 1.49700 | 81.5 | 74.11 |
| 16 | −4870.803 | | | | 0.20 |
| 17 | 59.426 | 6.65 | 1.59240 | 68.3 | 66.97 |
| 18 | 110.806 | (Variable) | | | 65.83 |
| 19* | 193.100 | 1.00 | 1.88300 | 40.8 | 26.60 |
| 20 | 15.942 | | | | 5.75 |
| 21 | −84.825 | 5.62 | 1.80518 | 25.4 | 21.31 |
| 22 | −15.435 | 1.00 | 1.75500 | 52.3 | 20.99 |
| 23 | 28.946 | | | | 1.04 |
| 24 | 23.521 | 5.14 | 1.60342 | 38.0 | 19.79 |
| 25 | −34.224 | | | | 1.35 |
| 26 | −21.891 | 1.00 | 1.83481 | 42.7 | 19.21 |
| 27 | −73.757 | (Variable) | | | 19.93 |
| 28 | −27.948 | 1.00 | 1.74320 | 49.3 | 22.39 |
| 29 | 45.763 | 3.34 | 1.84666 | 23.8 | 25.05 |
| 30 | −1456.063 | (Variable) | | | 25.74 |
| 31 (Stop) | ∞ | | | | 1.30 |
| 32 | 327.417 | 4.88 | 1.65844 | 50.9 | 31.09 |
| 33 | −37.552 | | | | 0.15 |
| 34 | 83.507 | 3.20 | 1.51823 | 58.9 | 32.36 |
| 35 | −244.441 | | | | 0.15 |
| 36 | 51.232 | 7.00 | 1.51633 | 64.1 | 31.93 |
| 37 | −36.909 | 1.80 | 1.83400 | 37.2 | 31.67 |
| 38 | 246.588 | | | | 35.20 |

-continued

Unit: mm

| | | | | | |
|---|---|---|---|---|---|
| 39 | 65.751 | 5.88 | 1.48749 | 70.2 | 30.36 |
| 40 | −46.500 | | | | 1.67 |
| 41 | −96.271 | 1.80 | 1.83481 | 42.7 | 28.04 |
| 42 | 24.286 | 8.00 | 1.51742 | 52.4 | 26.70 |
| 43 | −47.829 | | | | 0.50 |
| 44 | 240.698 | 6.93 | 1.48749 | 70.2 | 26.42 |
| 45 | −36.398 | 1.80 | 1.83400 | 37.2 | 26.27 |
| 46 | −175.777 | | | | 0.18 |
| 47 | 27.258 | 4.90 | 1.51633 | 64.1 | 27.08 |
| 48 | 121.400 | | | | 4.50 |
| 49 | ∞ | 30.00 | 1.60342 | 38.0 | 40.00 |
| 50 | ∞ | 16.20 | 1.51633 | 64.2 | 40.00 |
| 51 | ∞ | (Variable) | | | 40.00 |
| Image surface | ∞ | | | | |

Aspherical surface data
Nineteenth surface $\kappa = -1.11918e+002$  $A4 = 1.90965e-005$  $A6 = 1.18391e-007$
$A8 = -7.70463e-010$  $A10 = -6.40314e-012$  $A12 = -6.79949e-015$
$A3 = -1.42246e-005$  $A5 = -1.78591e-006$  $A7 = 1.54986e-009$
$A9 = 7.21174e-011$  $A11 = 3.45230e-013$ Various data
Zoom ratio 20.00

| | Wide angle | Intermediate | Telephoto |
|---|---|---|---|
| Focal length | 8.20 | 41.00 | 164.00 |
| F-number | 1.80 | 1.80 | 2.73 |
| Half angle of field | 33.85 | 7.64 | 1.92 |
| Image height | 5.50 | 5.50 | 5.50 |
| Total lens length | 322.84 | 322.84 | 322.84 |
| BF | 7.86 | 7.86 | 7.86 |
| d18 | 1.12 | 39.54 | 52.16 |
| d27 | 54.58 | 10.87 | 7.31 |
| d30 | 4.40 | 9.70 | 0.64 |
| d51 | 7.86 | 7.86 | 7.86 |
| Entrance pupil position | 68.91 | 217.64 | 577.51 |
| Exit pupil position | 456.37 | 456.37 | 456.37 |
| Front principal point position | 77.26 | 262.38 | 801.48 |
| Rear principal point position | −0.34 | −33.14 | −156.14 |

Zoom lens unit data

| Unit | Leading surface | Focal length | Lens structure length | Front principal point position | Rear principal point position |
|---|---|---|---|---|---|
| 1 | 1 | 64.72 | 92.60 | 57.69 | 5.60 |
| 2 | 19 | −13.70 | 21.91 | 2.51 | −12.13 |
| 3 | 28 | −42.20 | 4.34 | −0.12 | −2.49 |
| 4 | 31 | 61.42 | 136.02 | 68.43 | −143.45 |

Amounts of movement of the second sub unit and the third sub unit during focusing (the direction from the object side toward the image side corresponds to the positive direction)

| Unit | Infinity | 2.5 m | Minimum distance (0.82 m) |
|---|---|---|---|
| Second sub unit | 0 | 4.01 | 11.32 |
| Third sub unit | 0 | −0.44 | −1.24 |

(Numerical Embodiment 3)

Unit: mm

Surface data

| Surface number | r | d | nd | vd | Effective diameter |
|---|---|---|---|---|---|
| 1 | −1394.396 | 5.50 | 1.83400 | 37.2 | 247.33 |
| 2 | 741.975 | 2.00 | | | 237.87 |
| 3 | 623.943 | 16.56 | 1.80518 | 25.4 | 235.77 |
| 4 | −5276.110 | 5.00 | | | 233.80 |
| 5 | −1180.510 | 5.50 | 1.72916 | 54.7 | 233.27 |
| 6 | 2806.585 | 2.00 | | | 227.33 |
| 7 | 1085.396 | 18.19 | 1.59240 | 68.3 | 223.38 |
| 8 | −744.172 | 0.20 | | | 221.20 |
| 9 | 450.462 | 4.50 | 2.00330 | 28.3 | 204.56 |
| 10 | 229.891 | 0.02 | | | 200.51 |
| 11 | 225.838 | 29.66 | 1.43387 | 95.1 | 200.78 |
| 12 | −2381.667 | 49.59 | | | 200.83 |
| 13 | 263.045 | 20.18 | 1.43387 | 95.1 | 199.57 |
| 14 | 1880.174 | 0.20 | | | 198.76 |
| 15 | 222.504 | 19.01 | 1.43387 | 95.1 | 192.48 |
| 16 | 772.583 | 0.20 | | | 190.94 |
| 17 | 230.849 | 14.99 | 1.49700 | 81.5 | 182.72 |
| 18 | 543.412 | (Variable) | | | 180.15 |
| 19 | 268.944 | 2.00 | 1.81600 | 46.6 | 50.74 |
| 20 | 58.663 | 6.78 | | | 45.35 |
| 21 | −167.962 | 1.90 | 1.75500 | 52.3 | 44.51 |
| 22 | 124.304 | 5.43 | | | 43.61 |
| 23 | −87.283 | 1.90 | 1.81600 | 46.6 | 43.70 |
| 24 | 73.008 | 10.05 | 1.92286 | 21.3 | 46.25 |
| 25 | −79.581 | 1.09 | | | 46.92 |
| 26 | −75.798 | 2.20 | 1.88300 | 40.8 | 46.83 |
| 27 | 295.867 | (Variable) | | | 48.54 |
| 28 | 300.546 | 10.26 | 1.59240 | 68.3 | 69.73 |
| 29 | −129.390 | 0.20 | | | 70.72 |
| 30 | 213.995 | 10.66 | 1.48749 | 70.2 | 71.88 |
| 31 | −157.026 | 3.04 | | | 71.82 |
| 32 | −99.893 | 2.50 | 1.72047 | 34.7 | 71.67 |
| 33 | −126.735 | 0.20 | | | 72.35 |
| 34 | 118.088 | 2.50 | 1.84666 | 23.9 | 70.93 |
| 35 | 62.493 | 0.12 | | | 68.35 |
| 36 | 61.014 | 14.10 | 1.49700 | 81.5 | 68.59 |
| 37 | −6767.690 | 0.20 | | | 68.02 |
| 38 | 127.098 | 6.95 | 1.48749 | 70.2 | 66.83 |
| 39 | −9031.175 | (Variable) | | | 65.99 |
| 40 (Stop) | ∞ | 4.50 | | | 30.89 |
| 41 | −76.206 | 1.80 | 1.81600 | 46.6 | 29.26 |
| 42 | 57.329 | 0.20 | | | 28.76 |
| 43 | 37.532 | 5.70 | 1.80809 | 22.8 | 29.09 |
| 44 | 143.612 | 4.97 | | | 28.25 |
| 45 | −56.408 | 2.00 | 1.88300 | 40.8 | 27.55 |
| 46 | 91.618 | 30.04 | 1.80518 | 25.4 | 28.00 |
| 47 | −451.779 | 5.50 | | | 31.21 |
| 48 | −778.121 | 6.39 | 1.62041 | 60.3 | 32.03 |
| 49 | −82.192 | 0.20 | | | 32.55 |
| 50 | −385.987 | 2.10 | 1.83400 | 37.2 | 32.43 |
| 51 | 52.980 | 8.31 | 1.62041 | 60.3 | 32.41 |
| 52 | −48.784 | 0.20 | | | 32.65 |
| 53 | 228.661 | 8.78 | 1.48749 | 70.2 | 32.17 |
| 54 | −38.133 | 2.10 | 1.83400 | 37.2 | 31.52 |
| 55 | −104.874 | 0.20 | | | 31.79 |
| 56 | 82.711 | 6.22 | 1.62041 | 60.3 | 31.39 |
| 57 | −1012.775 | 2.00 | | | 30.31 |
| 58 | ∞ | 55.50 | 1.51633 | 64.2 | 30.00 |
| 59 | ∞ | (Variable) | | | 30.00 |
| Image surface | ∞ | | | | |

Various data
Zoom ratio 66.00

| | Wide angle | Intermediate | Telephoto |
|---|---|---|---|
| Focal length | 10.00 | 70.00 | 660.00 |
| F-number | 1.80 | 1.79 | 3.30 |
| Half angle of field | 28.81 | 4.49 | 0.48 |

-continued

Unit: mm

| | | | |
|---|---|---|---|
| Image height | 5.50 | 5.50 | 5.50 |
| Total lens length | 682.84 | 682.84 | 682.84 |
| BF | 9.60 | 9.60 | 9.60 |
| d18 | 2.01 | 118.64 | 159.55 |
| d27 | 245.65 | 105.11 | 3.29 |
| d39 | 3.50 | 27.41 | 88.32 |
| d59 | 9.60 | 9.60 | 9.60 |
| Entrance pupil position | 202.07 | 862.07 | 7327.95 |
| Exit pupil position | 973.75 | 973.75 | 973.75 |
| Front principal point position | 212.17 | 937.15 | 8439.76 |
| Rear principal point position | −0.40 | −60.40 | −650.40 |

Zoom lens unit data

| Unit | Leading surface | Focal length | Lens structure length | Front principal point position | Rear principal point position |
|---|---|---|---|---|---|
| 1 | 1 | 237.11 | 193.30 | 115.74 | −27.42 |
| 2 | 19 | −27.50 | 31.34 | 8.57 | −12.73 |
| 3 | 28 | 67.50 | 50.73 | 13.98 | −22.12 |
| 4 | 40 | 53.53 | 146.71 | 56.67 | 5.49 |

Amounts of movement of the second sub lens unit and the third sub lens unit during focusing (the direction from the object side toward the image side corresponds to the positive direction)

| Unit | Infinity | 7.0 m | Minimum distance (3.5 m) |
|---|---|---|---|
| Second sub lens unit | 0 | 18.77 | 36.28 |
| Third sub lens unit | 0 | −6.37 | −12.31 |

(Numerical Embodiment 4)

Unit: mm

Surface data

| Surface number | r | d | nd | vd | Effective diameter |
|---|---|---|---|---|---|
| 1 | −530.376 | 3.60 | 1.69680 | 55.5 | 142.56 |
| 2 | 165.378 | 0.19 | | | 133.88 |
| 3 | 161.194 | 12.02 | 1.84666 | 23.8 | 133.85 |
| 4 | 352.064 | 16.78 | | | 132.22 |
| 5 | −260.922 | 3.30 | 1.69680 | 55.5 | 131.18 |
| 6 | 4499.165 | 1.95 | | | 130.52 |
| 7 | 3870.394 | 16.59 | 1.59522 | 67.7 | 130.38 |
| 8 | −182.368 | 0.18 | | | 130.14 |
| 9 | 199.557 | 3.50 | 1.80518 | 25.4 | 118.20 |
| 10 | 129.950 | 0.35 | | | 115.09 |
| 11 | 129.504 | 18.86 | 1.43875 | 94.9 | 115.12 |
| 12 | −1216.762 | 19.97 | | | 114.13 |
| 13 | 242.465 | 12.50 | 1.43387 | 95.1 | 106.17 |
| 14 | −537.542 | 3.66 | | | 105.63 |
| 15 | −245.337 | 3.30 | 1.72047 | 34.7 | 105.48 |
| 16 | ∞ | 0.20 | | | 105.72 |
| 17 | 327.997 | 10.17 | 1.59522 | 67.7 | 105.92 |
| 18 | −585.797 | 0.20 | | | 105.59 |
| 19 | 155.419 | 10.72 | 1.59522 | 67.7 | 102.64 |
| 20 | 1296.787 | (Variable) | | | 101.37 |
| 21* | 165.395 | 2.00 | 1.77250 | 49.6 | 56.81 |
| 22 | 37.146 | 14.11 | | | 48.85 |
| 23 | −77.559 | 1.78 | 1.59240 | 68.3 | 48.44 |
| 24 | 113.504 | 0.20 | | | 48.58 |
| 25 | 73.918 | 7.29 | 1.75520 | 27.5 | 49.10 |
| 26 | −296.384 | (Variable) | | | 48.81 |
| 27 | −277.366 | 3.96 | 1.73800 | 32.3 | 41.26 |
| 28 | −79.369 | 2.01 | | | 40.95 |
| 29 | −56.263 | 1.78 | 1.77250 | 49.6 | 40.23 |
| 30* | −2657.308 | (Variable) | | | 40.08 |
| 31 | −66.369 | 1.78 | 1.80400 | 46.6 | 39.03 |
| 32 | 193.076 | 4.48 | 1.92286 | 18.9 | 41.41 |
| 33 | −759.765 | (Variable) | | | 42.53 |
| 34 (Stop) | ∞ | 1.04 | | | 43.85 |
| 35 | 223.177 | 6.68 | 1.62041 | 60.3 | 45.33 |
| 36 | −68.375 | 0.15 | | | 45.83 |
| 37 | 225.080 | 4.68 | 1.62041 | 60.3 | 46.24 |
| 38 | −127.203 | 0.15 | | | 46.20 |
| 39 | 154.994 | 8.66 | 1.49700 | 81.5 | 45.07 |
| 40 | −57.050 | 1.40 | 2.00069 | 25.5 | 44.34 |
| 41 | −5844.896 | 0.12 | | | 44.38 |
| 42 | 43.453 | 7.90 | 1.61800 | 63.3 | 44.43 |
| 43 | 1709.456 | 26.85 | | | 43.59 |
| 44 | −161.109 | 0.90 | 1.90366 | 31.3 | 30.44 |
| 45 | 27.230 | 5.90 | 1.92286 | 18.9 | 29.65 |
| 46 | −1056.595 | 7.71 | | | 29.45 |
| 47 | −41.739 | 0.90 | 2.00330 | 28.3 | 27.77 |
| 48 | 57.854 | 4.00 | | | 28.81 |
| 49 | −159.857 | 4.09 | 1.51633 | 64.1 | 30.46 |
| 50 | −42.842 | 0.12 | | | 31.82 |
| 51 | 413.643 | 7.00 | 1.51633 | 64.1 | 34.51 |
| 52 | −46.752 | 1.00 | | | 35.88 |
| 53 | 45.952 | 7.00 | 1.48749 | 70.2 | 38.15 |
| 54 | 322.720 | (Variable) | | | 37.70 |
| Image surface | ∞ | | | | |

Aspherical surface data

Twenty-first surface

K = 2.15670e+001     A4 = −3.58385e−007     A6 = −5.56407e−011
A8 = −1.66067e−012   A10 = 1.05419e−015     A12 = −9.86185e−019
A3 = −8.05605e−007   A5 = −1.18990e−008     A7 = 2.77600e−011
A9 = −6.20819e−015   A11 = 1.74173e−017

Thirtieth surface

K = −2.12127e+004    A4 = −1.66067e−007     A6 = 9.63198e−010
A8 = 1.15647e−012    A10 = 1.54902e−015     A12 = −2.67831e−018
A3 = −1.03485e−006   A5 = −2.96554e−008     A7 = 1.12857e−011
A9 = −1.56984e−013   A11 = 1.32849e−016

Various data
Zoom ratio 7.50

| | Wide angle | Intermediate | Telephoto |
|---|---|---|---|
| Focal length | 34.00 | 102.47 | 255.00 |
| F-number | 2.70 | 2.70 | 2.70 |
| Half angle of field | 24.58 | 8.63 | 3.49 |
| Image height | 15.55 | 15.55 | 15.55 |
| Total lens length | 428.68 | 428.68 | 428.68 |
| BF | 48.98 | 48.98 | 48.98 |
| d20 | 1.12 | 65.93 | 97.53 |
| d26 | 19.40 | 7.71 | 2.02 |
| d30 | 83.52 | 22.33 | 4.84 |
| d33 | 2.00 | 10.06 | 1.65 |
| d54 | 48.98 | 48.98 | 48.98 |
| Entrance pupil position | 136.97 | 315.10 | 542.83 |
| Exit pupil position | −141.5 | −141.52 | −141.52 |
| Front principal point position | 164.90 | 362.46 | 456.49 |
| Rear principal point position | 14.98 | −53.49 | −206.02 |

-continued

Unit: mm

Zoom lens unit data

| Unit | Leading surface | Focal length | Lens structure length | Front principal point position | Rear principal point position |
|---|---|---|---|---|---|
| 1 | 1  | 153.50  | 138.04 | 94.05 | 6.87 |
| 2 | 21 | −64.00  | 25.37  | −0.01 | −21.47 |
| 3 | 27 | −150.19 | 7.74   | 5.35  | 0.07 |
| 4 | 31 | −97.68  | 6.25   | −0.46 | −3.77 |
| 5 | 34 | 56.15   | 96.25  | 21.99 | −105.37 |

Amounts of movement of the second sub lens unit and the third sub lens unit during focusing (the direction from the object side toward the image side corresponds to the positive direction)

| Unit | Infinity | 7.0 m | Minimum distance (1.5 m) |
|---|---|---|---|
| Second sub lens unit | 0 | 3.85 | 16.38 |
| Third sub lens unit | 0 | −0.37 | −1.58 |

TABLE 1

| Conditional Expression | Numerical Embodiment | | | |
|---|---|---|---|---|
| | 1 | 2 | 3 | 4 |
| (1) f1/f2 | −7.00 | −4.72 | −8.62 | −2.40 |
| (2) f11/f12 | −1.01 | −0.54 | −1.13 | −0.88 |
| (3) \|δ12/δ13\| | 2.72 | 9.16 | 2.95 | 10.38 |
| (4) f12/f1 | 2.67 | 3.16 | 3.22 | 1.30 |
| (5) f13/f1 | 1.06 | 1.05 | 1.05 | 1.13 |
| (6) N12n − N12p | 0.27 | 0.26 | 0.49 | 0.29 |
| (7) ν12p − ν12n | 55.74 | 49.22 | 53.43 | 55.92 |
| (8) \|δ13 × f1/f13/IS\| | 0.461 | 0.107 | 1.065 | 0.045 |
| f11 | −376.35 | −111.07 | −860.78 | −176.63 |
| f12 | 374.21 | 204.39 | 763.57 | 199.61 |
| f13 | 148.91 | 67.90 | 249.19 | 173.67 |

TABLE 2

| | Numerical Embodiment | | | |
|---|---|---|---|---|
| | 1 | 2 | 3 | 4 |
| Focal length of entire system (infinity) | 10.00 | 8.20 | 10.00 | 34.00 |
| Focal length of entire system (minimum distance) | 10.16 | 8.21 | 10.32 | 33.16 |
| Change rate (%) (infinity-minimum distance)/infinity | −1.60 | −0.12 | −3.20 | 2.47 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180895, filed Aug. 17, 2012, which is hereby incorporated by reference herein in its entirety.

What is claimed is:

1. A zoom lens, comprising, in order from an object side:
a first lens unit having a positive refractive power which does not move for zooming;
a second lens unit having a negative refractive power which moves during zooming;
at least one zoom lens unit which moves during zooming;
a stop; and
an imaging lens unit which does not move for zooming,
wherein the first lens unit comprises:
a first sub lens unit having the negative refractive power which does not move for focus adjustment;
a second sub lens unit having the positive refractive power which moves to an image side during the focus adjustment from an object at infinity to an object at a short distance; and
a third sub lens unit having the positive refractive power which moves to the object side during the focus adjustment from the object at infinity to the object at the short distance, and
wherein the following conditional expressions are satisfied:

$$-15.0 < f1/f2 < -2.0;$$

$$-1.50 < f11/f12 < -0.35; \text{ and}$$

$$2.5 \leq |\delta 12/\delta 13| < 15.0,$$

where f1 is a focal length of the first lens unit, f2 is a focal length of the second lens unit, f11 is a focal length of the first sub lens unit, f12 is a focal length of the second sub lens unit, δ12 is an amount of movement of the second sub lens unit during the focus adjustment from the object at infinity to an object at a minimum distance, and δ13 is an amount of movement of the third sub lens unit during the focus adjustment from the object at infinity to the object at the minimum distance.

2. A zoom lens according to claim 1, wherein the following conditional expressions are satisfied:

$$1.0 < f12/f1 < 4.0; \text{ and}$$

$$0.8 < f13/f1 < 1.3,$$

where f13 is a focal length of the third sub lens unit.

3. A zoom lens according to claim 1, wherein the first sub lens unit comprises one or more concave lens and one convex lens, and comprises, in order from the object side, a concave lens and a convex lens, which are arranged in the stated order.

4. A zoom lens according to claim 1, wherein the second sub lens unit comprises at least two convex lenses and at least one concave lens, and satisfies the following conditional expressions:

$$0.15 < N12n - N12p < 0.60; \text{ and}$$

$$30 < \nu 12p - \nu 12n < 70,$$

where N12p and ν12p are an average refractive index and an average Abbe number of the at least two convex lenses constituting the second sub lens unit, and N12n and ν12n are an average refractive index and an average Abbe number of the at least one concave lens constituting the second sub lens unit.

5. An image pickup apparatus, comprising:
a zoom lens comprising, in order from an object side:
a first lens unit having a positive refractive power which does not move for zooming;
a second lens unit having a negative refractive power which moves during zooming;

at least one zoom lens unit which moves during zooming;

a stop; and an imaging lens unit which does not move for zooming, wherein the first lens unit comprises:
- a first sub lens unit having the negative refractive power which does not move for focus adjustment;
- a second sub lens unit having the positive refractive power which moves to an image side during the focus adjustment from an object at infinity to an object at a short distance; and
- a third sub lens unit having the positive refractive power which moves to the object side during the focus adjustment from the object at infinity to the object at the short distance, and wherein the following conditional expressions are satisfied:

$-15.0 < f1/f2 < -2.0;$ $-1.50 < f11/f12 < -0.35;$ and $2.5 \leq |\delta12/\delta13| < 15.0,$ where f1 is a focal length of the first lens unit, f2 is a focal length of the second lens unit, f11 is a focal length of the first sub lens unit, f12 is a focal length of the second sub lens unit, $\delta12$ is an amount of movement of the second sub lens unit during the focus adjustment from the object at infinity to an object at a minimum distance, and $\delta13$ is an amount of movement of the third sub lens unit during the focus adjustment from the object at infinity to the object at the minimum distance; and a solid-state image pickup element for receiving an image formed by the zoom lens.

6. An image pickup apparatus according to claim 5, wherein the following conditional expression is satisfied:

$0.02 < |\delta13 \times f1/f13/IS| < 1.50,$ where IS is a diagonal length of an effective photography area of the solid-state image pickup element.

* * * * *